United States Patent
Ooga

(10) Patent No.: US 11,053,877 B2
(45) Date of Patent: *Jul. 6, 2021

(54) AIR FLOW RATE MEASURING DEVICE

(71) Applicant: DENSO CORPORATION, Kariya (JP)

(72) Inventor: Takashi Ooga, Kariya (JP)

(73) Assignee: DENSO CORPORATION, Kariya (JP)

( * ) Notice: Subject to any disclaimer, the term of this patent is extended or adjusted under 35 U.S.C. 154(b) by 148 days.

This patent is subject to a terminal disclaimer.

(21) Appl. No.: 16/386,762

(22) Filed: Apr. 17, 2019

(65) Prior Publication Data

US 2019/0242321 A1 Aug. 8, 2019

Related U.S. Application Data

(62) Division of application No. 15/488,624, filed on Apr. 17, 2017, now Pat. No. 10,519,886.

(30) Foreign Application Priority Data

May 24, 2016 (JP) .................. 2016-103036

(51) Int. Cl.
| | |
|---|---|
| *G01F 1/684* | (2006.01) |
| *F02D 41/18* | (2006.01) |
| *G01F 5/00* | (2006.01) |
| *G01M 15/02* | (2006.01) |
| *G01M 15/04* | (2006.01) |

(52) U.S. Cl.
CPC .............. *F02D 41/18* (2013.01); *G01F 1/684* (2013.01); *G01F 1/6842* (2013.01); *G01F 1/6847* (2013.01); *G01F 5/00* (2013.01); *G01M 15/02* (2013.01); *G01M 15/042* (2013.01)

(58) Field of Classification Search
CPC .......... G01F 1/684; G01F 1/6842; G01F 5/00; G01M 15/02; G01M 15/042
USPC ......................................... 73/114.32, 114.34
See application file for complete search history.

(56) References Cited

U.S. PATENT DOCUMENTS

| | | |
|---|---|---|
| 6,332,356 B1 | 12/2001 | Hecht et al. |
| 2006/0021429 A1 | 2/2006 | Konzelmann et al. |
| 2007/0062275 A1 | 3/2007 | Beyrich et al. |
| 2010/0064799 A1 | 3/2010 | Mais et al. |
| 2011/0000289 A1 | 1/2011 | Konzelmann et al. |
| 2013/0014572 A1 | 1/2013 | Kitahara |

(Continued)

FOREIGN PATENT DOCUMENTS

| | | |
|---|---|---|
| JP | 2004-012274 A | 1/2004 |
| JP | 2015-068792 A | 4/2015 |

(Continued)

OTHER PUBLICATIONS

Non-Final Office Action dated Oct. 3, 2018 in co-pending U.S. Appl. No. 15/488,624.

*Primary Examiner* — Eric S. McCall

(57) ABSTRACT

The present disclosure provides an air flow rate measuring including a casing and a sensor. The casing includes a main-bypass passage that defines an inlet and an outlet, a sub-bypass passage that branches off from the main-bypass passage at a branching area, and a guiding wall that changes, at a position upstream of the branching area, a flow direction of the passing air taken in from the inlet. The inlet and the guiding wall are arranged in an arranging direction along a flow direction of the intake air in the duct. The guiding wall includes an inlet side surface that faces the inlet and is not perpendicular to the arranging direction.

21 Claims, 20 Drawing Sheets

(56) References Cited

U.S. PATENT DOCUMENTS

| | | |
|---|---|---|
| 2013/0019675 A1 | 1/2013 | Ban et al. |
| 2015/0101402 A1 | 4/2015 | Kishikawa et al. |
| 2015/0114098 A1 | 4/2015 | Kamiya |
| 2016/0116314 A1 | 4/2016 | Akagi et al. |
| 2016/0313165 A1 | 10/2016 | Sudou et al. |
| 2017/0059381 A1 | 3/2017 | Ban et al. |
| 2017/0276525 A1 | 9/2017 | Morino et al. |
| 2018/0023496 A1 | 1/2018 | Itakura et al. |

FOREIGN PATENT DOCUMENTS

| | | |
|---|---|---|
| JP | 2015-068793 A | 4/2015 |
| WO | 2006003717 A1 | 4/2008 |

AIR FLOW RATE MEASURING DEVICE

CROSS REFERENCE TO RELATED APPLICATION

This application is a divisional application of U.S. patent application Ser. No. 15/488,624 filed on Apr. 17, 2017, which is based on Japanese Patent Application No. 2016-103036 filed on May 24, 2016. The contents of these applications are incorporated herein by reference in their entirety.

TECHNICAL FIELD

The present disclosure relates to an air flow rate measuring device attached to a duct through which an intake air for an internal combustion engine flows.

BACKGROUND

Air flow rate measuring devices that measure a flow rate of an intake air for an internal combustion engine have been known. Such devices may include an attachment portion attached to a duct and a casing that extends from the attachment portion in a vertical direction into an inside of the duct. The casing houses a sensor to detect a flow rate of the intake air.

To improve accuracy of detecting a flow rate, a sensor chip including a plurality of film resistors arranged on a surface of a semiconductor substrate has been used in recent years.

In the duct, foreign substances such as dusts, which were not removed by an air cleaner, may be mixed in the intake air and be taken in the casing. If such foreign substances collide with the sensor chip, the resistors of the sensor chip may be damaged.

In view of this, some air flow rate measuring devices include a main-bypass passage and a sub-bypass passage.

The main-bypass passage takes in an intake air from the duct, and then discharges the intake air into the duct again. The sub-bypass passage branches off form the main-bypass passage and takes in a portion of the intake air from the main-bypass passage, and then returns the portion of the intake air into the main-bypass passage. The sensor chip is housed in the sub-bypass passage (see Patent Literature JP 2004-012274 A).

Hence, a major portion of foreign substances taken in through the inlet together with the intake air flows through only the main-bypass passage without flowing through the sub-bypass passage 12 and is discharged through the outlet 14 into the duct 2 by inertial force.

However, if an air cleaner having a low capturing power were used, or if a vehicle were traveling in an environment containing many dusts, it would be necessary to reduce an amount of foreign substances flowing into the sub-bypass passage from the main-bypass passage.

In view of the above, it is an objective of the present disclosure to provide an air flow rate measuring device that is capable of reducing an amount of foreign substances flowing into the sub-bypass passage from the main-bypass passage.

SUMMARY

An aspect of the present disclosure provides an air flow rate measuring device. The air flow rate measuring device includes a casing and a sensor. The casing is attached to a duct through which an intake air for an internal combustion engine flows. A portion of the intake air passes through the casing as a passing air. The sensor detects a flow rate of the passing air. The air flow rate measuring device measures a flow rate of the intake air based on a detection result of the sensor. The casing includes a main-bypass passage, a sub-bypass passage, and a guiding wall. The main-bypass passage defines an inlet to take in the intake air and an outlet to discharge the passing air taken in from the inlet. The sub-bypass passage branches off from the main-bypass passage at a branching area downstream of the inlet. The sensor is disposed in the sub-bypass passage. The guiding wall changes, at a position upstream of the branching area, a flow direction of the passing air taken in from the inlet. The inlet and the guiding wall are arranged in an arranging direction along a flow direction of the intake air in the duct. The guiding wall includes an inlet side surface that faces the inlet and that is not perpendicular to the arranging direction.

According to the above-described aspect, the inlet of the main-bypass passage and the guiding wall are arranged in the casing along the flow direction of the intake air in the duct. Thus, it is possible to bring foreign substances, which were taken in from the inlet together with the intake air, into contact with the guiding wall. Hence, kinetic energy of the foreign substances can be reduced by the collisions with the guiding wall. Therefore, the foreign substances are less likely to be taken into the sub-bypass passage from the branching area, whereby an amount of the foreign substances taken into the sub-bypass passage from the main-bypass passage can be decreased.

Accordingly, it would be possible to suppress the foreign substances to collide with and/or adhere to the sensor chip of the sensor.

Furthermore, the guiding wall includes the inlet side surface that is not perpendicular to the arranging direction of the inlet and the guiding wall.

Thus, it is possible to further decrease kinetic energy of the foreign substances at a position away from the sensor chip of the sensor.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

Figure 1:
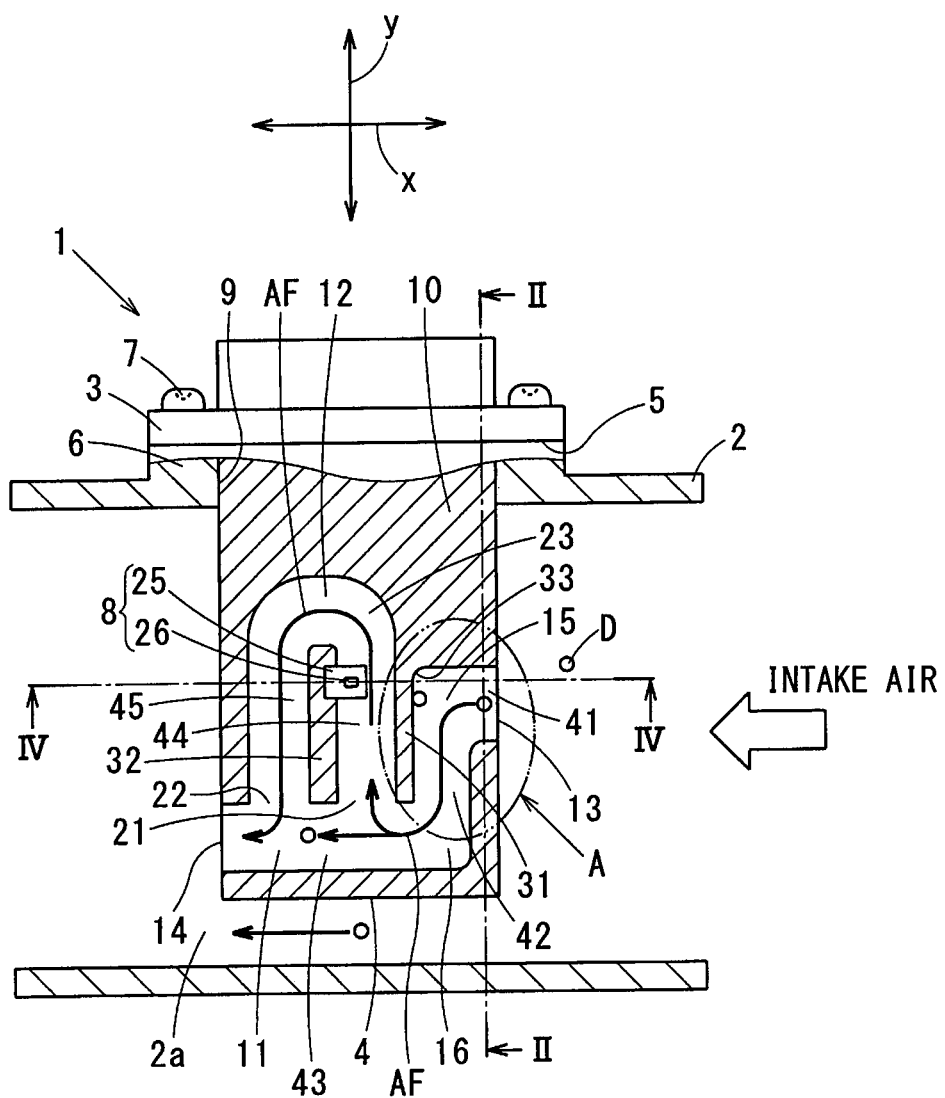
FIG. 1 is a cross-sectional view of an air flow rate measuring device attached to a duct (a first embodiment)
Figure 2:
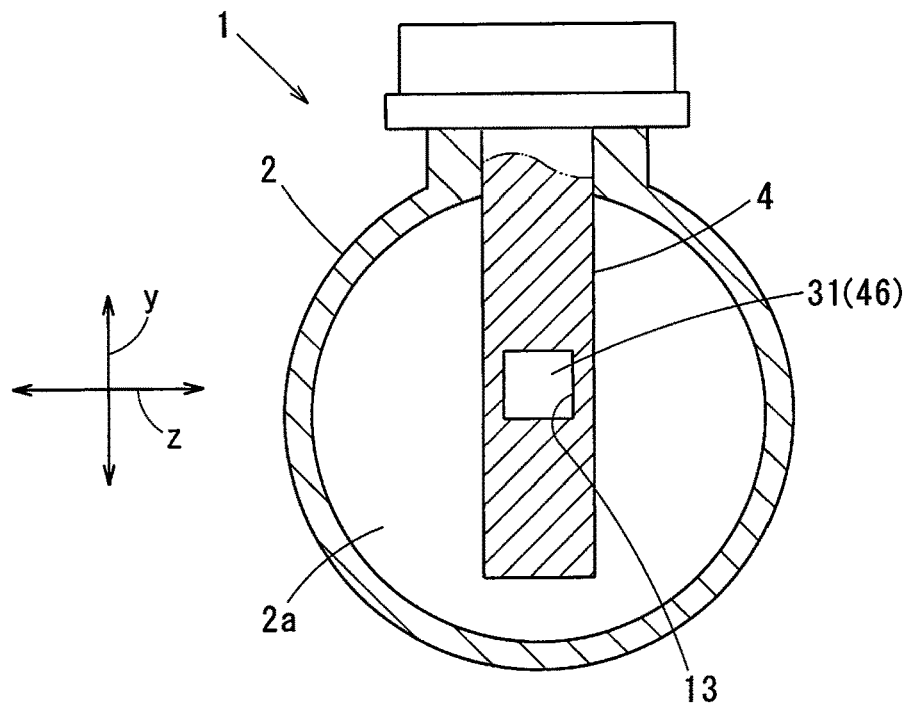
FIG. 2 is a cross-sectional view taken along II-II line in FIG. 1.
Figure 3:
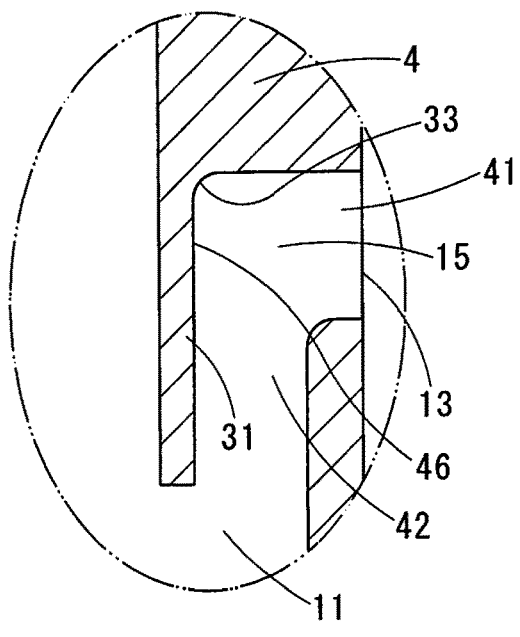
FIG. 3 is an expanded view of a portion indicted by A in FIG. 1.

It is needless to say that following embodiments are some examples of the present disclosure, and therefore the present disclosure is not limited to these embodiment. Furthermore, each of the substantially same structures among the embodiments will be assigned to the respective common referential numeral and the description of the substantially same structures will be omitted in the subsequent embodiments.

First Embodiment

FIGS. 1 to 4 show an air flow rate measuring device according to a first embodiment of the present disclosure.

The air flow rate measuring device 1 is attached to a duct 2 through which a main flow of an intake air for an internal combustion engine flows.

The air flow rate measuring device 1 includes an attachment portion 3 and a casing 4 as will be described below. The air flow rate measuring device 1 measures a flow rate of an intake air based on a detection result of a sensor 8.

The attachment portion 3 includes an attachment surface 5 having a plane shape to attach the air flow rate measuring device 1 to the duct 2. The attachment portion 3 is disposed outside of the duct 2. The attachment portion 3 is fixed to a wall 6 of the duct 2 by screws 7. The attachment surface 5 is pressed by fastening forces of the screws 7 to be in contact with an attachment surface of the duct 2 formed in an outside surface of the wall 6. The attachment surface 5 extends in parallel with a flow direction of the intake air in the duct 2.

The casing 4 houses the sensor 8 that detects a flow rate of the intake air which is passing through the casing 4 (hereinafter, may be referred to as a "passing air AF"). The casing 4 is disposed in the duct 2 to protrude into an inside of the duct 2 by inserting the casing 4 through an insertion hall 9 into the inside of the duct 2.

A fitting portion 10 is fit in the insertion hall 9 between the attachment portion 3 and the casing 4. An O-ring is disposed between an outer circumferential surface of the fitting portion 10 and an inner wall of the insertion hall 9 to seal the duct 2.

The casing 4 extends in a direction perpendicular to the attachment surface 5.

The casing 4 includes a main-bypass passage 11 and a sub-bypass passage 12.

The main-bypass passage 11 takes in an intake air from the duct 2, and then discharges the intake air into the duct 2 again. The main-bypass passage 11 includes an inlet 13 for taking in a portion of a main flow of the intake air and an outlet 14 for discharging the passing air AF taken in through the inlet 13.

The inlet 13 is open toward an upstream side of an intake passage 2a of the duct 2. The inlet 13 is open around a center of the duct 2. The opening shape of the inlet 13 is a square shape.

The outlet 14 is open at a downstream side end of the casing 4. The outlet 14 is open toward a downstream side of the intake passage 2a.

As shown in the figures, a flow direction of the intake air and the passing air AF flowing through the duct 2 may be referred to as an "x-axis direction".

Further, a direction perpendicular to the x-axis direction may be referred to as a "y-axis direction" along which the casing 4 protrudes inside the duct 2.

A direction perpendicular to both the x-axis direction and the y-axis direction may be referred to as a "z-axis direction".

The main-bypass passage 11 includes a first curved portion 15 and a second curved portion 16.

The first curved portion 15 is a passage that first changes a flow direction of the passing air AF from the inlet 13 in the main-bypass passage 11. The first curved portion 15 changes the flow direction of the passing air AF from the x-axis direction to the y-axis direction (i.e., the downward direction in the figures).

The second curved portion 16 is a passage that changes a flow direction of the passing air AF at a position downstream of the first curved portion 15. The second curved portion 16 changes the direction of the passing air AF from the y-axis direction to a downstream direction along the x-axis direction.

A portion of the main-bypass passage 11 from the second curved portion 16 to the outlet 14 linearly extends along the x-axis direction.

Each of the angles of the first and second curved portions 15, 16 is 90 degrees.

The sub-bypass passage 12 takes in the passing air AF from the main-bypass passage 11 and then returns the passing air AF to the main-bypass passage 11. The sub-bypass passage 12 branches off from the main-bypass passage 11 at a branching area 21. The sensor 8 is disposed in the sub-bypass passage 12.

The branching area 12 of the sub-bypass passage 12 is at a position downstream of the first and second curved portions 15, 16.

The merging area 22 of the sub-bypass passage 12 is at a position downstream of the sensor 8.

The sub-bypass passage 12 includes a third curved portion 23.

The third curved portion 23 is a most upstream side passage that changes, in the sub-bypass passage 12, a direction of the passing air AF from the branching area 21. The third curved portion 23 changes the direction of the passing air AF from an upward direction along the y-axis direction to a downward direction along the y-axis direction at 180 degrees. That is, the third curved portion 23 has a U-turn structure.

Hence, a major portion of particulate foreign substances (hereinafter, may be referred to as "dusts D") taken in from the inlet 13 together with an intake air flows through only the main-bypass passage 11 without flowing through the sub-bypass passage 12 and is discharged through the outlet 14 into the duct 2 by inertial force.

The sensor 8 includes a sensor supporter 25 and a sensor chip 26. The sensor supporter 25 is made of resin and is integrally formed with a sub-bypass wall 32 of the casing 4. The sensor chip 26 is held by the sensor supporter 25.

The sensor chip 26 is housed in the sub-bypass passage 12 between the branching area 21 and the third curved portion 23. The sensor chip 26 includes a plurality of film resistors arranged on one surface of a semiconductor substrate. The sensor chip 26 is a thermal mass flow metering type sensor where energization to the resistors is utilized. The one surface of the substrate of the sensor chip 26 is arranged to be in parallel with a flow direction of the passing air AF flowing through the sub-bypass passage 12.

The casing 4 includes the main-bypass passage 11, the sub-bypass passage 12, a guiding wall 31, and the sub bypass wall 32.

The main-bypass passage 11 includes an inflow main-passage 41 into which the intake air flows through the inlet 13, a guiding passage 42 extending along the guiding wall 31, and a common passage 43 extending from the guiding passage 42 toward the outlet 14.

The inflow main-passage 41 serves as a first main-passage extending from the inlet 13 to the first curved portion 15.

The guiding passage 42 serves as a second main-passage from the first curved portion 15 to the second curved portion 16.

The common passage 43 serves as a third main-passage extending from the second curved portion 16 to the outlet 14.

The sub-bypass passage 12 includes an inflow sub-bypass passage 44 through which the passing air AF flows from the common passage 43 and an outflow sub-bypass passage 45 from which the passing air AF flows out toward the common passage 43.

The inflow sub-passage 44 serves as a first sub-passage extending from the branching area 21 to the third curved portion 23. The sensor 8 is disposed in the inflow sub-passage 44.

The outflow sub-bypass passage 45 serves as a second sub-passage extending from the third curved portion cross-sectional view to the merging area 22. The outflow sub-passage 45 is in fluid communication with the inflow sub-passage through the third curved portion 23.

The guiding wall 31 changes a flow direction of the passing air AF taken in from the inlet 13 at a position upstream of the branching area 21 of the sub-bypass passage 12. The guiding wall 31 is disposed at a position before the sub-bypass passage 12, i.e., upstream of the branching area 21. The guiding wall 31 is an outer circumferential surface 33 of the first curved portion 15 and forms a portion of a passage wall of the guiding passage 42.

The inlet 13 and the guiding wall 31 are arranged in the casing 4 along a flow direction of the intake air in the duct 2 (i.e., the x-axis direction).

The guiding wall 31 separates the guiding passage 42 from the inflow sub-passage 44 such that the inflow sub-passage 44 extends along the guiding passage 42.

Figure 4:
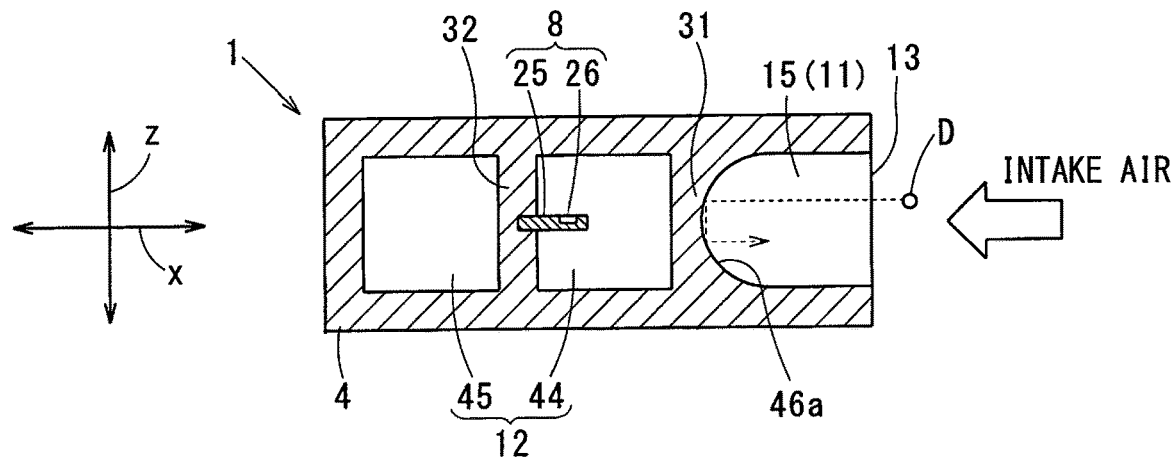
FIG. 4 is a cross-sectional view taken along IV-IV line in FIG. 1.

The guiding wall 31 includes an inlet side surface 46 that is not perpendicular to an arranging direction in which the inlet 13 and the guiding wall 31. As shown in FIG. 4. the inlet side surface 46 has a cross-sectional view with a curved surface 46a protruding toward a downstream side of a flow direction of the intake air in the inflow main passage 41. It should be noted that the cross-sectional view is taken along a plane perpendicular to an axis of a flow direction in the first curved portion 15 (i.e., an x-z plane defined by the x-axis direction and z-axis direction).

The sub-bypass wall 32 separates the inflow sub-bypass passage 44 from the outflow sub-bypass passage 45 such that the outflow sub-bypass passage 45 extends along the inflow sub-bypass passage 44. The sub-bypass wall 32 extends along the guiding wall 31 on a side of the inflow sub-passage 44 opposite to the guiding passage 42. The sub-bypass wall 32 is a portion of the inflow sub-passage 44 and a passage wall of the outflow sub-passage 45.

A flow direction (a first direction) of the passing air AF in the guiding passage 42, which is a portion of the main-bypass passage 11 from the first curved portion 15 to the branching area 21, and a flow direction (second direction) of the passing air AF in the inflow sub-passage 44, which is a portion of the sub-bypass passage 12 upstream of the sensor chip 26 of the sensor 8, form an angle of 180 degrees.

More specifically, the flow direction of the passing air AF in the guiding passage 42 extends from an upper position to a lower position along the y-axis direction as shown in FIG. 1. Further, the direction of the passing air AF in the inflow sub-passage 44 extends from a lower position to an upper position along the y-axis direction as shown in FIG. 1.

Thus, the direction of the passing air AF in the guiding passage 42 and the direction of the passing air AF in the inflow sub-passage 44 are opposite to each other.

As described above, the air flow rate measuring device 1 has the casing 4 including the inlet 13 to take in an intake air and the guiding wall 31 that changes a flow direction of the passing air AF taken into the inflow main-passage 41 from the inlet 13.

Further, the inlet 13 and the guiding wall 31 are arranged in the casing 4 along the flow direction of the intake air in the duct 2.

Thus, it is possible to bring the dusts D, which were taken in from the inlet 13 together with the intake air, into contact with the guiding wall 31 which is upstream of the branching area 21. Hence, kinetic energy of the dusts D can be reduced by the collisions with the guiding wall 31. Therefore, the dusts D are less likely to be taken into the sub-bypass passage 12 from the branching area 21, whereby an amount of the dusts D taken into the sub-bypass passage 12 from the main-bypass passage 11 can be substantially decreased.

Accordingly, it is possible to suppress the dusts D to collide with and/or adhere to the sensor chip 26 of the sensor 8.

The flow direction of the passing air AF in the guiding passage 42, which is the portion of the main-bypass passage 11 from the first curved portion 15 to the branching area 21, and the flow direction of the passing air AF in the inflow sub-passage 44, which is the portion of the sub-bypass passage 12 upstream of the sensor chip 26 of the sensor 8, form an angle of 180 degrees.

Thus, the passing air AF needs to significantly change the flow direction at the branching area 21 so as to flow into the sub-bypass passage 12, which makes the dusts D more difficult to flow into the sub-bypass passage 12 from the branching area 21. Therefore, effects to suppress the dusts D to collide with and/or adhere to the sensor chip 26 can be further enhanced.

It should be noted that the suppression effects obtained from the above-described opposite flow directions of the passing air AF will be improved when the sensor chip 26 is arranged in the inflow sub-passage 44 at a position upstream of the third curved portion 23.

The guiding wall 31 includes the inlet side surface 46 that is not perpendicular to the arranging direction of the inlet 13 and the guiding wall 31.

Thus, the dusts D, which are accelerated together with the intake air, are reflected by the curved surface 46a when colliding with the curved surface 46a, and then collide with the curved surface 46a again, as shown in FIG. 4. As a result, the number of collisions of the dusts D with the inlet side surface 46 increases, and thus it is possible to decrease kinetic energy of the dusts D at a position away from the sensor chip 26 of the sensor 8.

As a result, the dusts D are less likely to be taken into the sub-bypass passage 12 from the branching area 21, whereby it would be possible to further decrease an amount of the dusts D taken into the sub-bypass passage 12 from the main-bypass passage 11.

Therefore, it is possible to further suppress the dusts D to collide with and/or adhere to the sensor chip 26 of the sensor 8.

Second Embodiment

Figure 5:
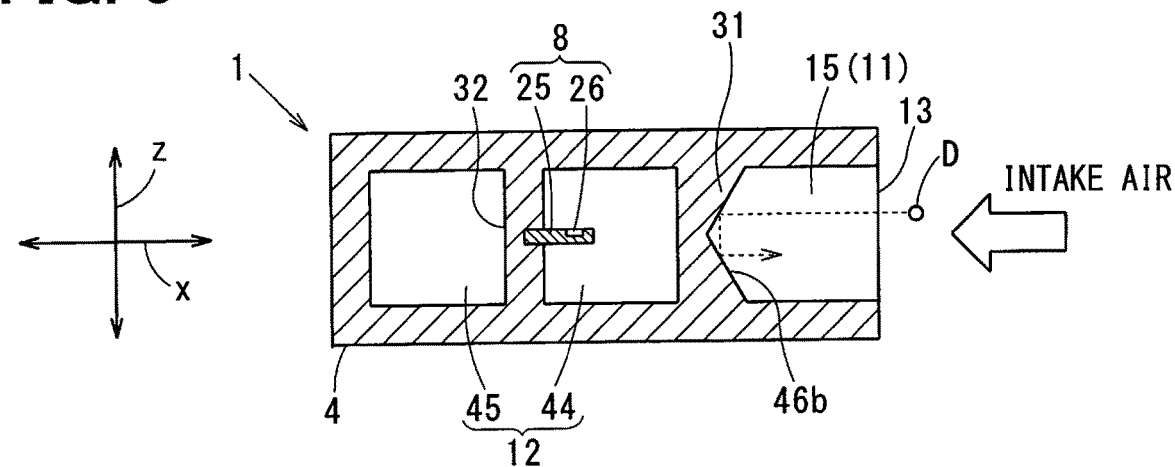
FIG. 5 is a cross-sectional view of an air flow rate measuring device (a second embodiment)

FIG. 5 shows an air flow measuring device 1 according to a second embodiment. The components denoted by the same reference numerals are the same as those described in the first embodiment.

The inlet side surface 46 of the guiding wall 31 has a cross-sectional view having slope surfaces 46b that form a V-shaped groove protruding toward a downstream side of a flow direction of the intake air taken in from the inlet 13. The cross-sectional view is taken along a plane perpendicular to an axis of a flow in the first curved portion 15 (i.e., an x-z plane).

Third Embodiment

Figure 6:
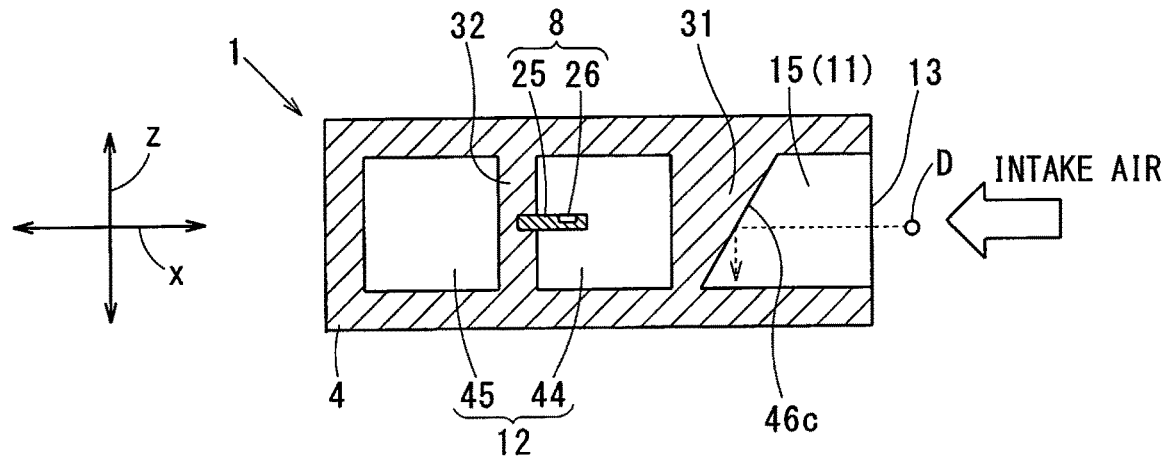
FIG. 6 is a cross-sectional view of an air flow rate measuring device (a third embodiment)

FIG. 6 shows an air flow measuring device 1 according to a third embodiment. The components denoted by the same reference numerals are the same as those described in the first embodiment.

The inlet side surface 46 of the guiding wall 31 has a cross-sectional view having a slope surface 46c that forms a tapering groove protruding toward a downstream side of a flow direction of the intake air taken in from the inlet 13. The cross-sectional view is taken along a plane perpendicular to an axis of a flow in the first curved portion 15 (i.e., an x-z plane).

Fourth Embodiment

Figure 7:
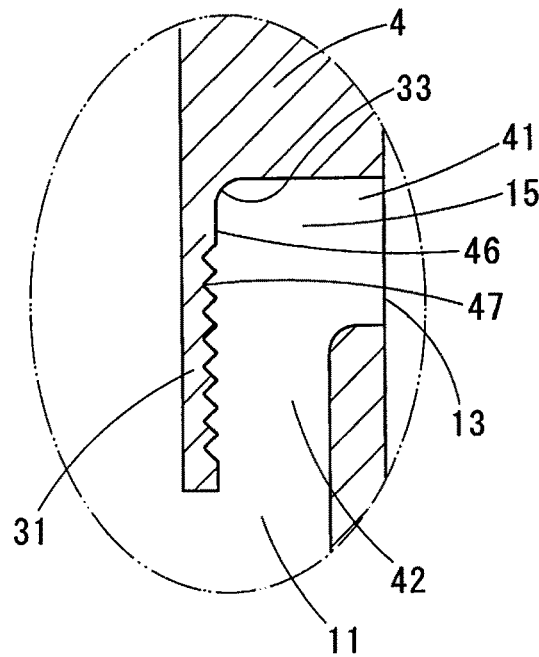
FIG. 7 is an expanded view of a guiding wall in a main-bypass passage (a fourth embodiment)

FIG. 7 shows an air flow measuring device 1 according to a fourth embodiment. The components denoted by the same reference numerals are the same as those described in the first embodiment.

The guiding wall 31 includes recessed portions 47 that are recessed from the inlet side surface 46 of the guiding wall 31 in a direction away from the inlet 13. Therefore, the dusts D can be captured by the recessed portions 47, and as a result, an amount of the dusts D flowing toward the branching area 21 can be reduced.

Furthermore, since the dusts D are further decelerated due to collisions with the recessed portions 47, it would be possible to suppress the dusts D to collide with and/or adhere to the sensor chip 26 of the sensor 8 even if the dusts D flow into the sub-bypass passage 12 from the branching area 21.

Fifth Embodiment

Figure 8:
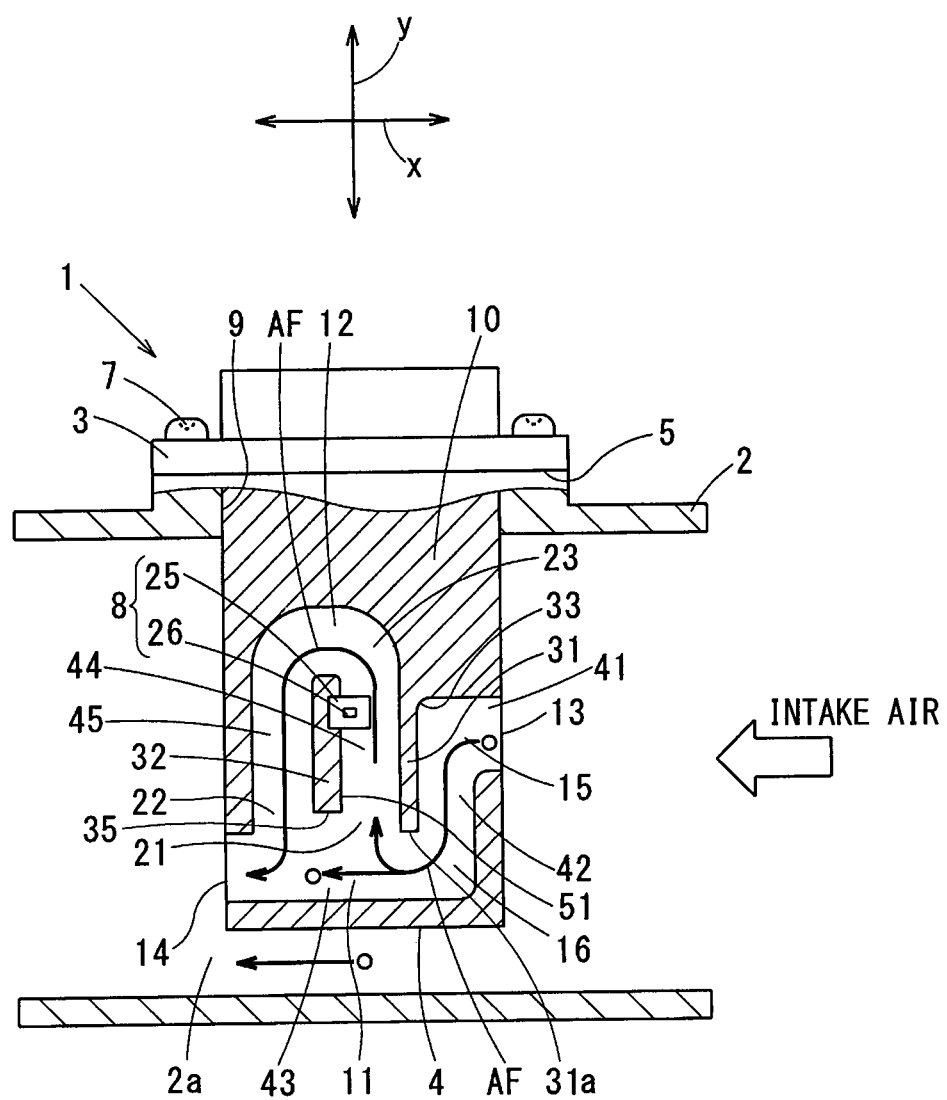
FIG. 8 is a cross-sectional view of an air flow rate measuring device attached to a duct (a fifth embodiment)

FIG. 8 shows an air flow measuring device according to a fifth embodiment. The components denoted by the same reference numerals are the same as those described in the first embodiment.

The guiding wall 31 protrudes toward the common passage 43 more than the sub-bypass wall 32 protrudes toward the common passage 43. In other words, a lower end 31a of the guiding wall 31 is lower than a lower end 35 of the sub-bypass wall 32 in the y-axis direction.

Accordingly, the dusts D are less likely to collide with the wall 51 of the sub-bypass wall 32, and thus the likelihood for the dusts D to flow into the sub-bypass passage 12 substantially decreases. Hence, an amount of the dusts D flowing into the sub-bypass passage 12 can be decreased.

Sixth Embodiment

Figure 9:
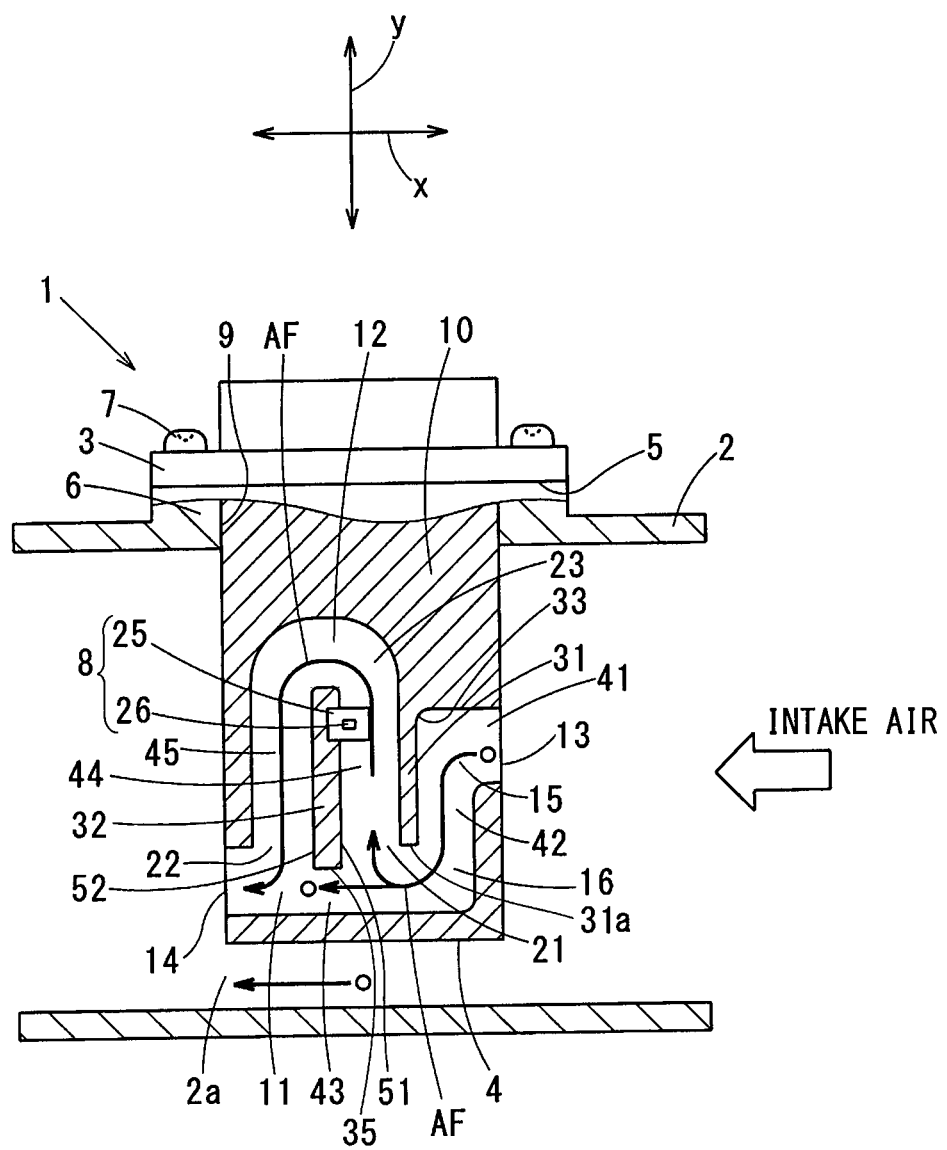
FIG. 9 is a cross-sectional view of an air flow rate measuring device attached to a duct (a sixth embodiment)

FIG. 9 shows an air flow measuring device 1 according to a sixth embodiment. The components denoted by the same reference numerals are the same as those described in the first embodiment.

The sub-bypass wall 32 protrudes toward the common passage 43 more than the guiding wall 31 protrudes toward the common passage 43. In other words, the lower end 31a of the guiding wall 31 is higher than the lower end 35 of the sub-bypass wall 32 in the y-axis direction.

Hence, the dusts D collide with the wall surface 51 of the sub-bypass wall 32, and therefore the dusts D further loses kinetic energy. Then, the dusts D flow into the sub-bypass passage 12. That is, the dusts D loses the kinetic energy due to the collisions immediately after flowing into the sub-bypass passage 12. Thus, it is possible to reduce kinetic energy of the dusts D at a position upstream of the sensor chip 26 of the sensor 8.

If the intake air flows back in the duct 2 due to pressure pulsation, the dusts D may flows into through the outlet 14. By using the above-described structure, however, the dusts D can collide with the wall surface 52 of the sub-bypass wall 32 at a position around the merging area 22, kinetic energy of the dusts D can be decreased. Thus, the collision of the dusts D with or adhesion of the dusts D to the sensor chip 26 can be suppressed even if back flow of the intake air occurs.

Seventh Embodiment

Figure 10:
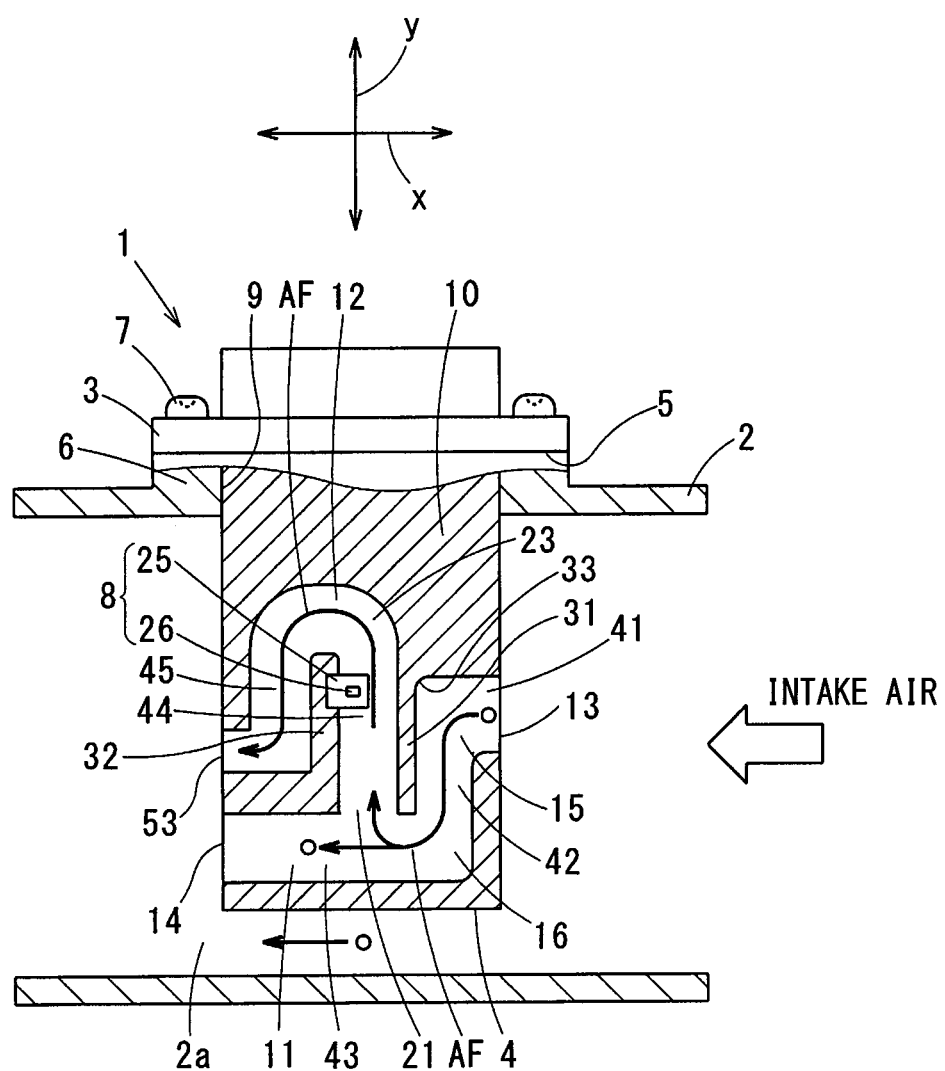
FIG. 10 is a cross-sectional view of an air flow rate measuring device attached to a duct (a seventh embodiment)

FIG. 10 shows an air flow measuring device 1 according to a seventh embodiment. The components denoted by the same reference numerals are the same as those described in the first embodiment.

The sub-bypass passage 12 does not merge into the main-bypass passage 11 and includes a discharging opening 53 different from the outlet 14 of the main-bypass passage 11.

The main-bypass passage 11 includes a portion downstream of the branching area 21 that has a cross-section greater than the sub-bypass passage 12. Hence, pressure loss generated in the portion of the main-bypass passage 11 is less than pressure loss generated in the sub-bypass passage 12.

As a result, a flow rate of the passing air AF flowing into the sub-bypass passage 12 is decreases. Therefore, an amount of the dusts D flowing into the sub-bypass passage 12 can be reduced.

Eighth Embodiment

Figure 11:
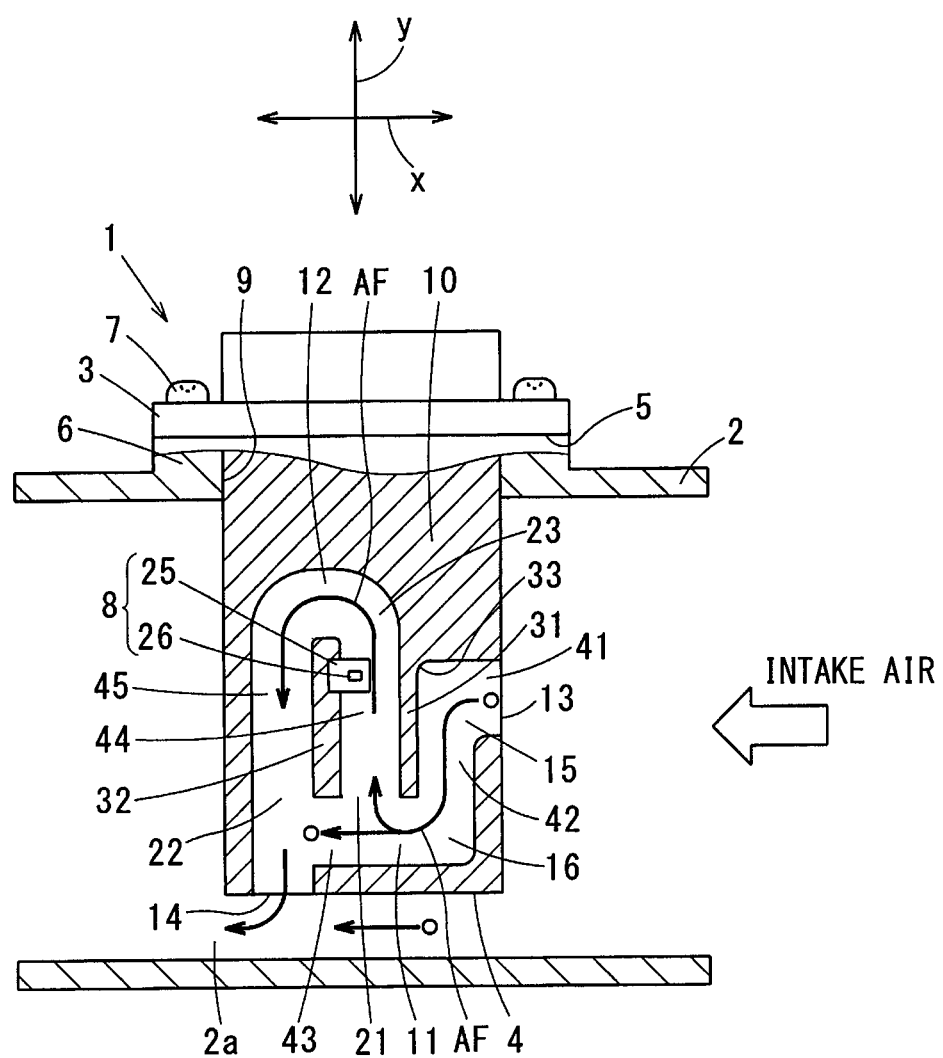
FIG. 11 is a cross-sectional view of an air flow rate measuring device attached to a duct (an eighth embodiment)

FIG. 11 shows an air flow measuring device 1 according to an eighth embodiment. The components denoted by the same reference numerals are the same as those described in the first embodiment.

The sub-bypass passage 12 merges into the main-bypass passage 11.

A flow direction of the intake air at the outlet 14 is angled with a flow direction of the passing air AF taken in through the inlet 13.

Accordingly, the flow of the intake air exiting the outlet 14 collide with the flow of the intake air inside the duct 2 at a right angle, and as a result, the discharge of the intake air through the outlet 14 can be suppressed. Therefore, it is possible to suppress the intake air to be taken in through the inlet 13, thereby suppressing inflow of the dusts D into the casing 4.

Ninth Embodiment

Figure 12:
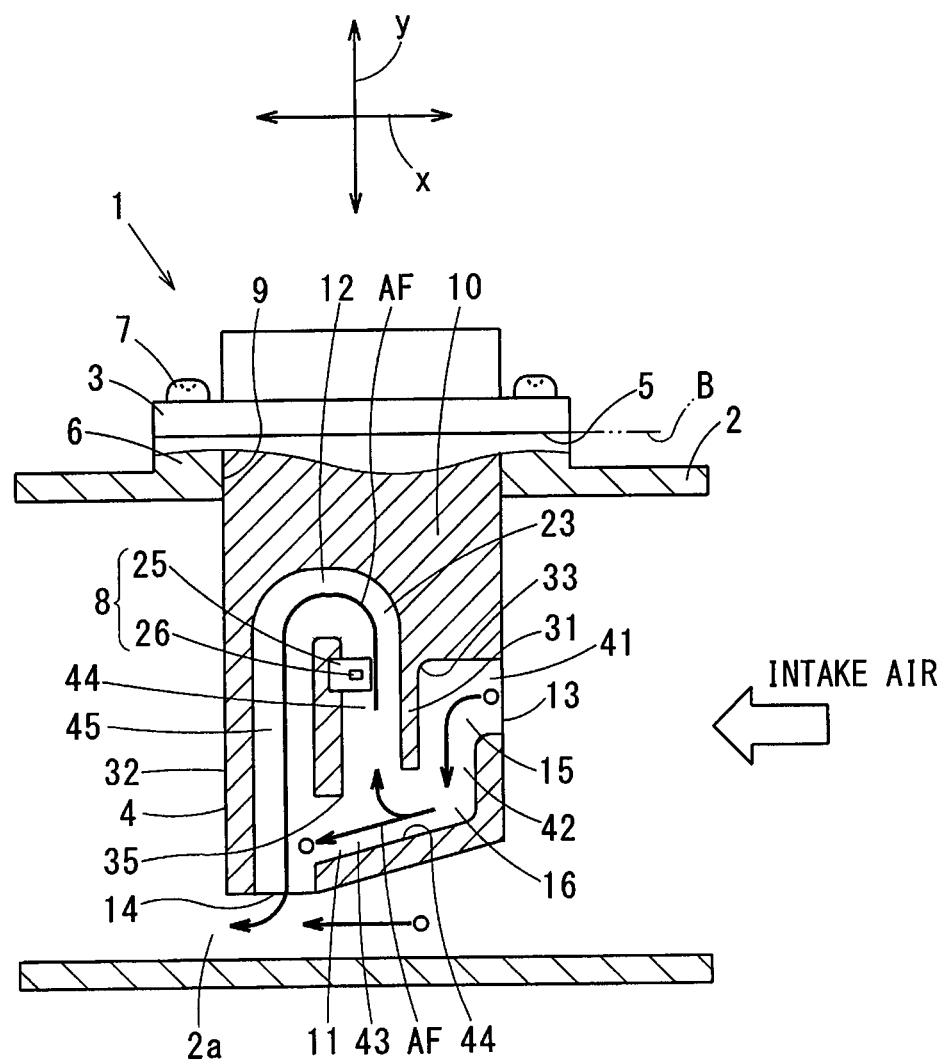
FIG. 12 is a cross-sectional view of an air flow rate measuring device attached to a duct (a ninth embodiment)

FIG. 12 shows an air flow measuring device 1 according to a ninth embodiment. The components denoted by the same reference numerals are the same as those described in the first, sixth, and eighth embodiments.

The outlet 14 of the main-bypass passage 11 is open at the lowest position of the casing 4 in the y-axis direction.

A direction of the passing air AF flowing through an area of the main-bypass passage 11 from the second curved portion 16 to the outlet 14 of the main-bypass passage 11 is gradually separated away from a plane surface B (hereinafter, referred to as a "reference plane B") along which the attachment surface 5 extends. In other words, the main-bypass wall 34 of the main-bypass passage 11 from the second curved portion 16 to the outlet 14 is inclined such that the main-bypass wall 34 is gradually separated from an end 35 of the sub-bypass wall 32 close to the common passage 35.

Hence, a flow axis of the main-bypass passage 11 can be angled so that the axis is gradually separated from the branching area 21 toward a downstream side of the main-bypass passage 11. Thus, the dusts D cannot flow into the sub-bypass passage 12 unless the dusts D significantly change the flow direction at the branching area 21. Hence, it is possible to enhance effects to suppress the dusts D to collide with or adhere to the sensor chip 26.

It should be noted that the angle of the first curved portion 15 is 90 degrees, whereas the angle of the second curved portion 16 is greater than 90 degrees.

Tenth Embodiment

Figure 13:
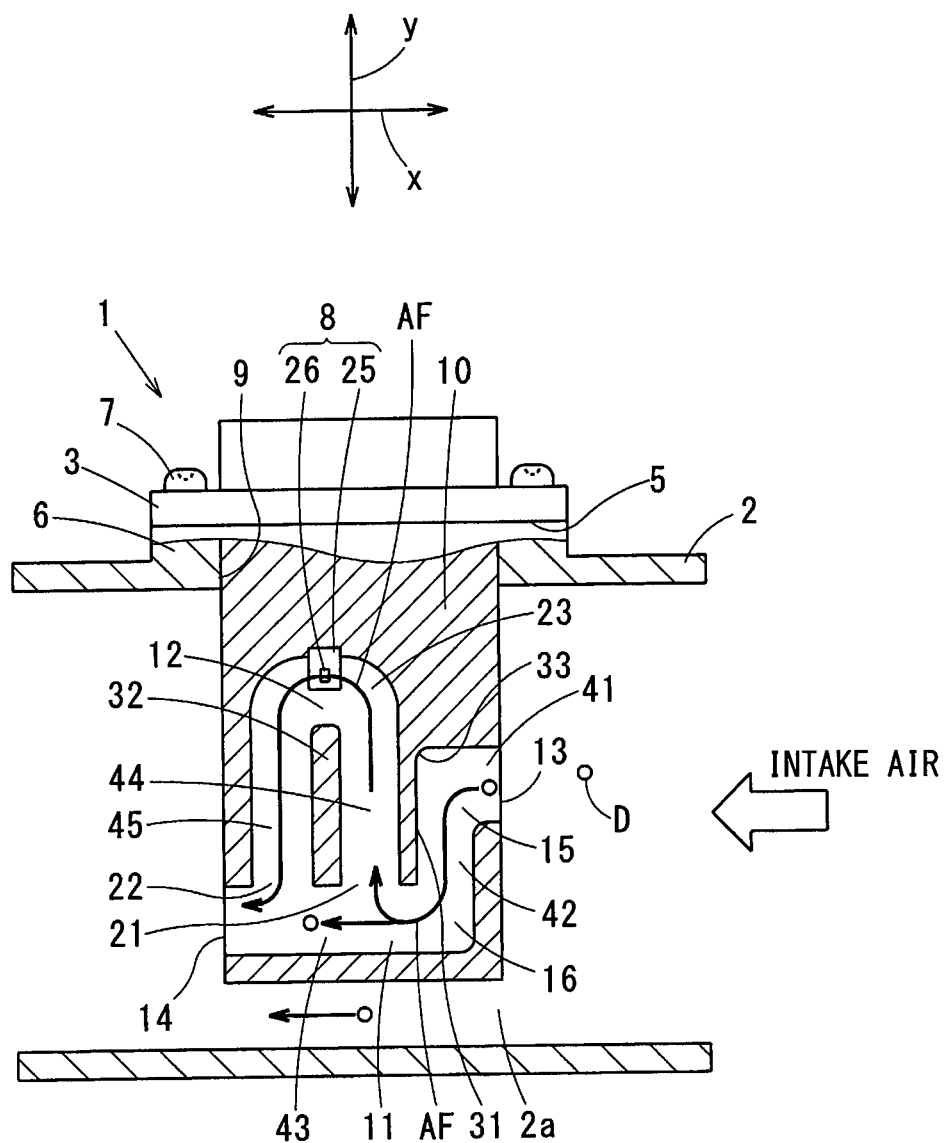
FIG. 13 is a cross-sectional view of an air flow rate measuring device attached to a duct (a tenth embodiment)

FIG. 13 shows an air flow measuring device 1 according to a tenth embodiment. The components denoted by the same reference numerals are the same as those described in the first embodiment.

In the air flow measuring device 1 according to the present embodiment, the sensor chip 26 is disposed in the middle of the third curved portion 23.

Alternatively, the sensor chip 26 may be disposed in a region of the sub-bypass passage 12 from the third curved portion 23 to the merging area 22 or the outlet 14. Furthermore, a passage extending in the x-axis direction may be formed in the middle of the third curved portion 23.

Eleventh Embodiment

Figure 14:
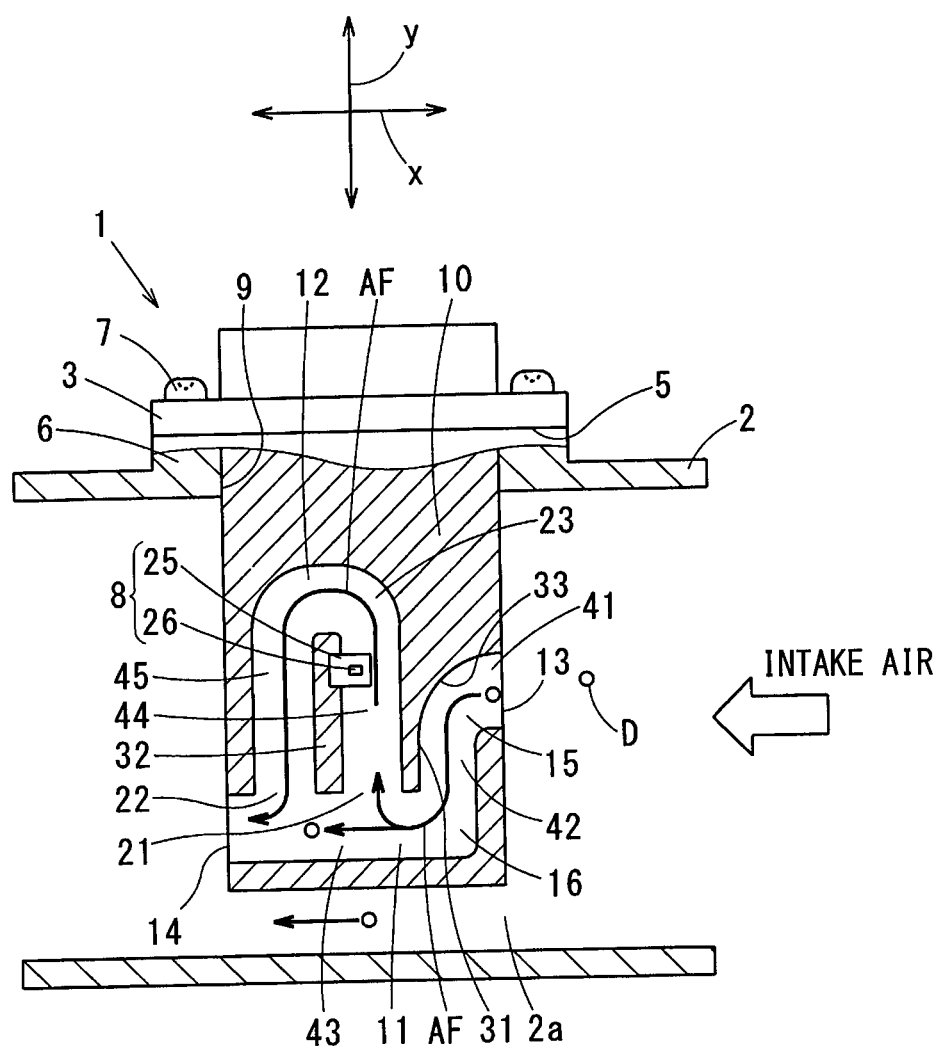
FIG. 14 is a cross-sectional view of an air flow rate measuring device attached to a duct (an eleventh embodiment)

FIG. 14 shows an air flow measuring device 1 according to an eleventh embodiment. The components denoted by the same reference numerals are the same as those described in the first embodiment.

In the air flow measuring device 1 according to the present embodiment, a recessed surface formed by curving the outer circumferential surface 33 of the first curved portion 15 from the x-axis direction to the y-axis direction.

Accordingly, the dusts D are swerved along the flow direction in the first curved portion 15 while colliding with the outer circumferential surface 33 of the first curved portion 15. Hence, the number of collisions of the dusts D with the guiding wall 31 increases, and thus kinetic energy of the dusts D can be further reduced before the dusts D reach the branching area 21.

It should be noted that the shape of the circumferential wall of the second curved portion 16 may be a recessed curved shape.

Twelfth Embodiment

Figure 15:
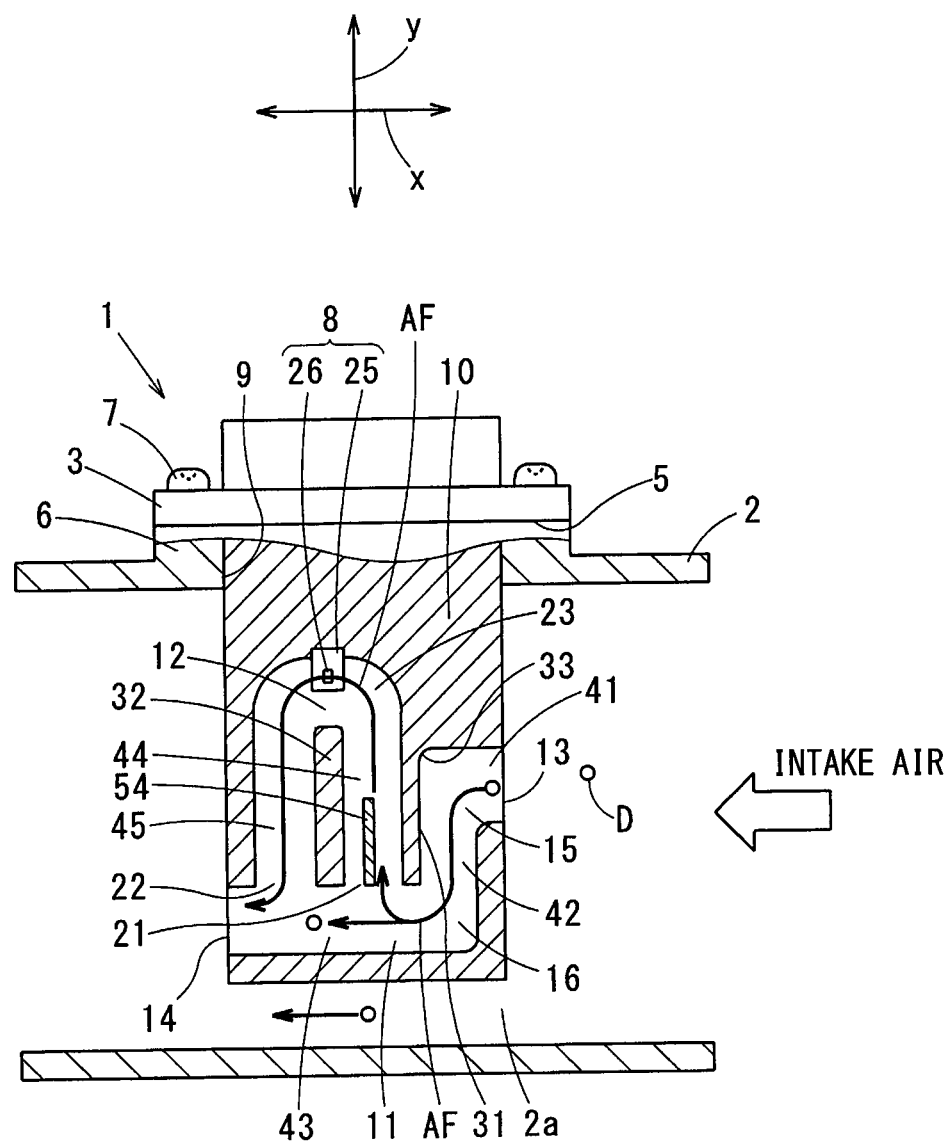
FIG. 15 is a cross-sectional view of an air flow rate measuring device attached to a duct (a twelfth embodiment)

FIG. 15 shows an air flow measuring device 1 according to a twelfth embodiment. The components denoted by the same reference numerals are the same as those described in the first and tenth embodiments.

The sub-bypass passage 12 includes an impact plate 54 that is disposed at a position upstream of the sensor chip 26 of the sensor 8 and extends along the flow direction of the passing air AF flowing through the inflow sub-bypass passage 44. Although the dusts D are slightly accelerated by receiving kinetic energy of the main flow of the intake air, even if the dusts D with increased kinetic energy are taken from the main-bypass passage 11 into the sub-bypass passage 12 upstream of the sensor chip 26, the flow rates of the dusts D are decreased due to collisions of the dusts D with the impact plate 54. As a result, the kinetic energy of the dusts D taken into the sub-bypass passage 12 from the branching area 21 can be decreased before the dusts D reach the branching area 21.

Thirteenth Embodiment

Figure 16:
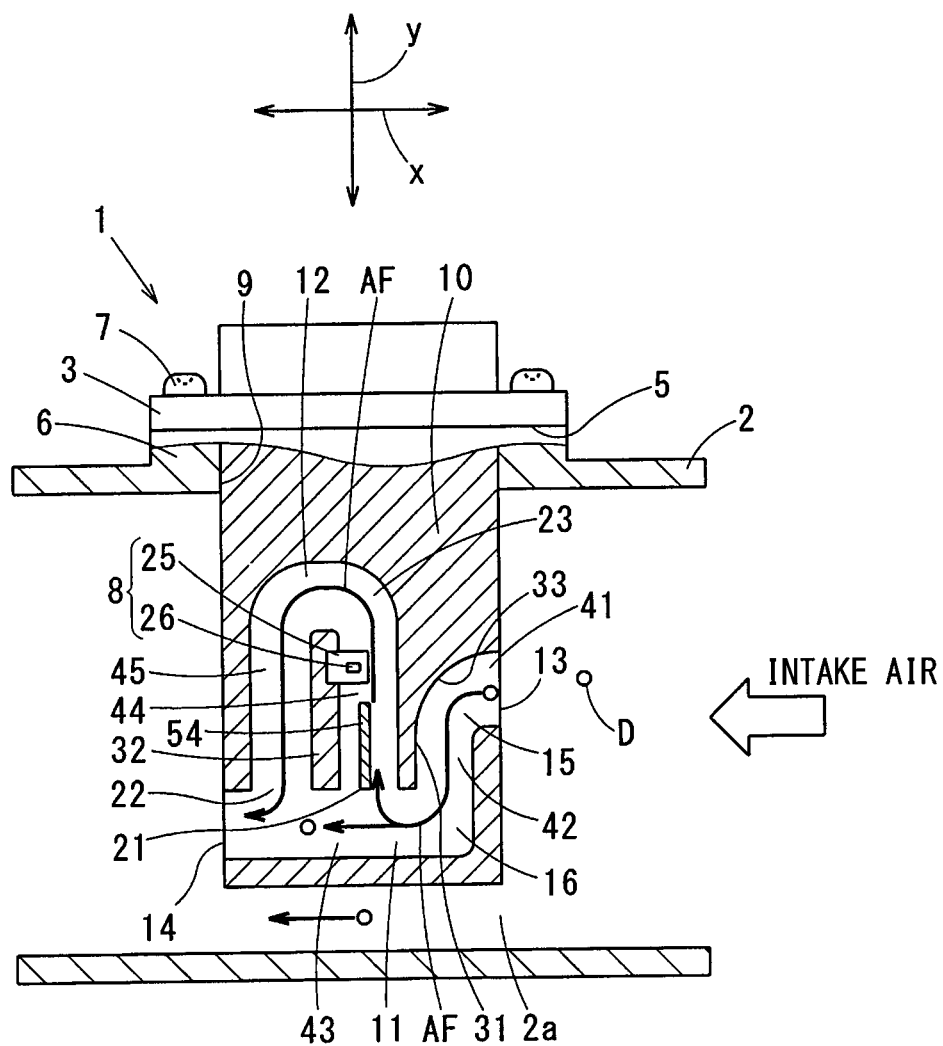
FIG. 16 is a cross-sectional view of an air flow rate measuring device attached to a duct (a thirteenth embodiment)

FIG. 16 shows an air flow measuring device 1 according to a thirteenth embodiment. The components denoted by the same reference numerals are the same as those described in the first and eleventh embodiments.

As with the twelfth embodiment, the sub-bypass passage 12 includes an impact plate 54 that is disposed at a position upstream of the sensor chip 26 of the sensor 8 and extends along the flow direction of the passing air AF flowing through the inflow by-pass passage 44.

Fourteenth Embodiment

Figure 17:
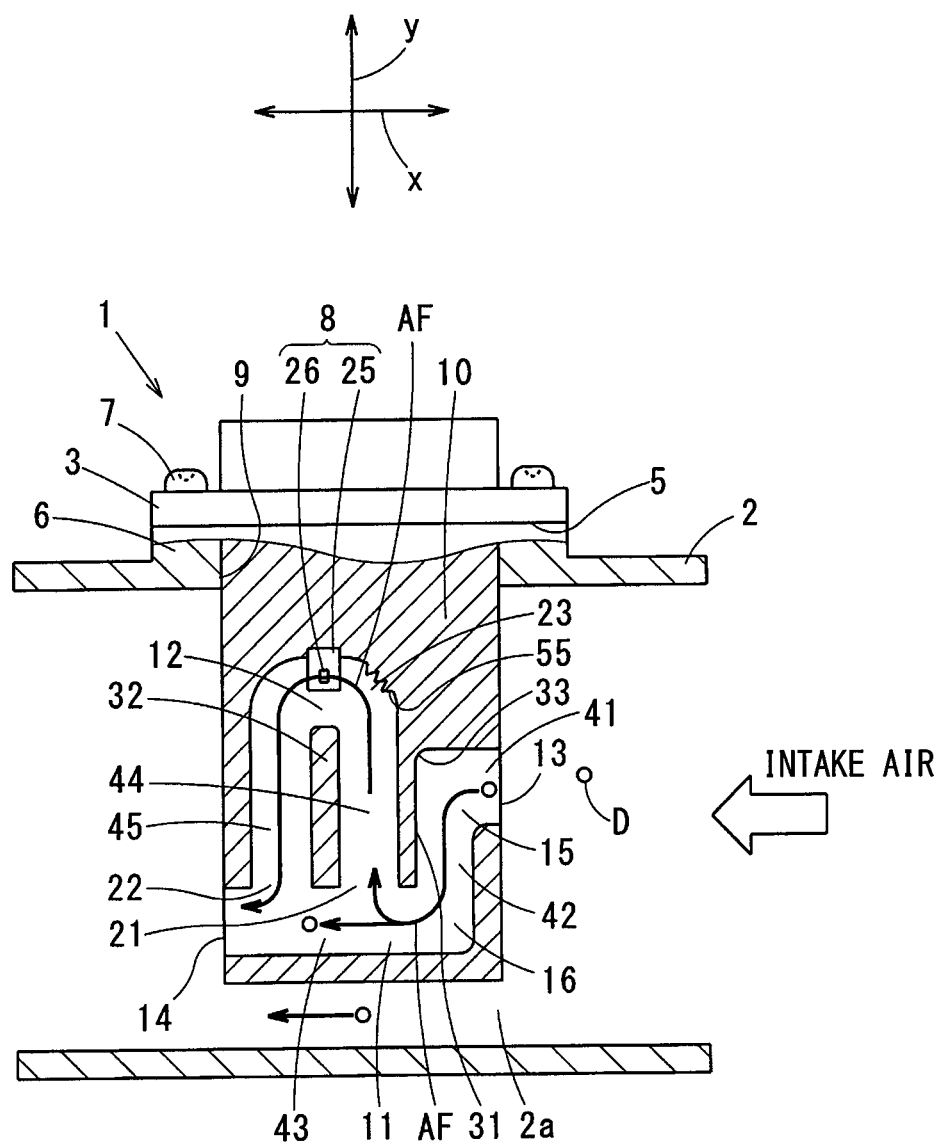
FIG. 17 is a cross-sectional view of an air flow rate measuring device attached to a duct (a fourteenth embodiment)

FIG. 17 shows an air flow measuring device 1 according to a fourteenth embodiment. The components denoted by the same reference numerals are the same as those described in the first and tenth embodiments.

The sub-bypass passage 12 includes a third curved portion 23 that changes, at a position upstream of the sensor chip 26, a flow direction of the passing air AF taken from the main-bypass passage 11.

The casing 4 includes a plurality of recessed portions 55 that are recessed from an outer circumferential surface of the third curved portion 23 in a direction radially outward of the third curved portion 23.

Although, the dusts D are slightly accelerated by receiving kinetic energy of the main flow, even if the dusts D with increased kinetic energy are taken from the main-bypass passage 11 into the sub-bypass passage 12 upstream of the sensor chip 26, the flow rates of the dusts D are decreased due to collisions of the dusts D with the recessed portions 55. As a result, the kinetic energy of the dusts D taken into the sub-bypass passage 12 from the branching area 21 can be decreased before the dusts D reach the branching area 21.

Fifteenth Embodiment

Figure 18:
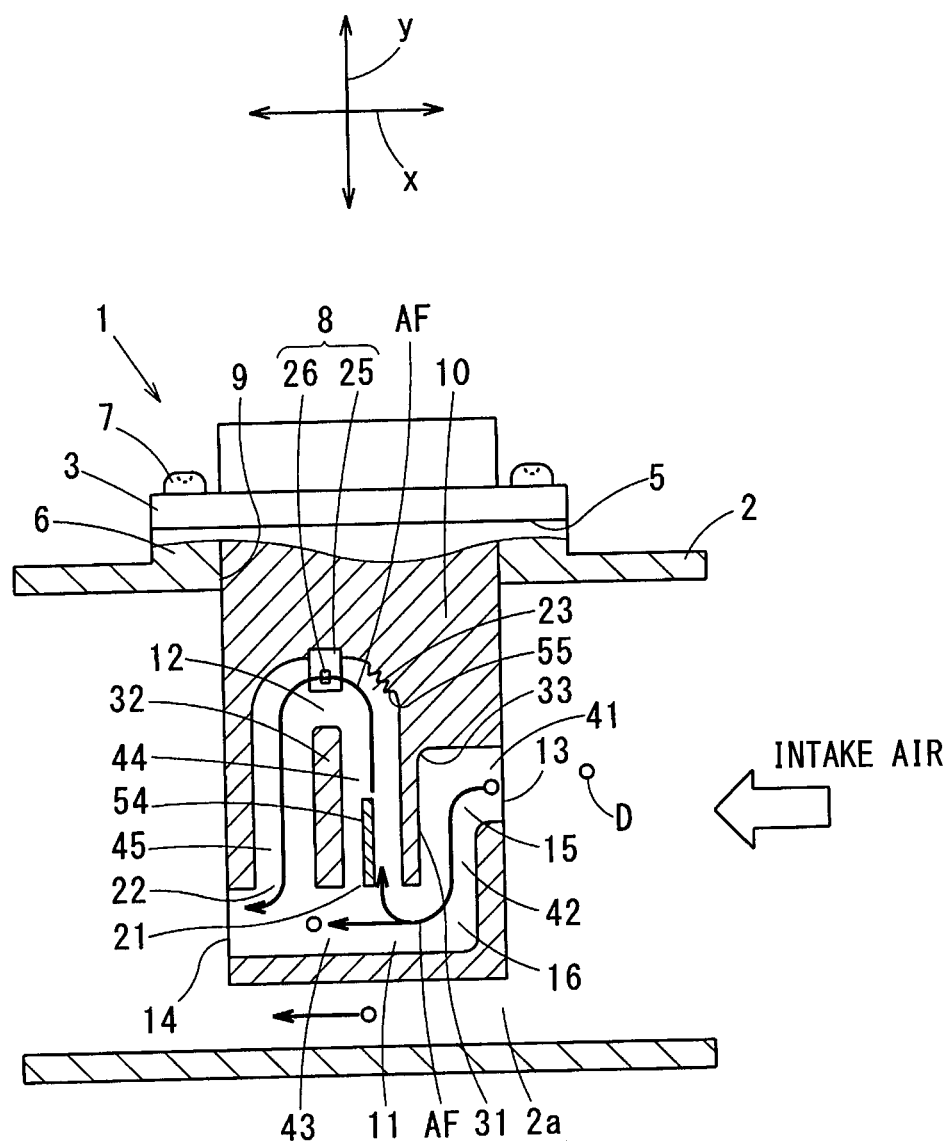
FIG. 18 is a cross-sectional view of an air flow rate measuring device attached to a duct (a fifteenth embodiment)

FIG. 18 shows an air flow measuring device 1 according to a fifteenth embodiment. The components denoted by the same reference numerals are the same as those described in the first and twelfth embodiments.

As with the fourteenth embodiment, the casing 4 includes a plurality of recessed portions 55 that are recessed from an outer circumferential surface of the third curved portion 23 in a direction radially outward of the third curved portion 23.

Sixteenth Embodiment

Figure 19:
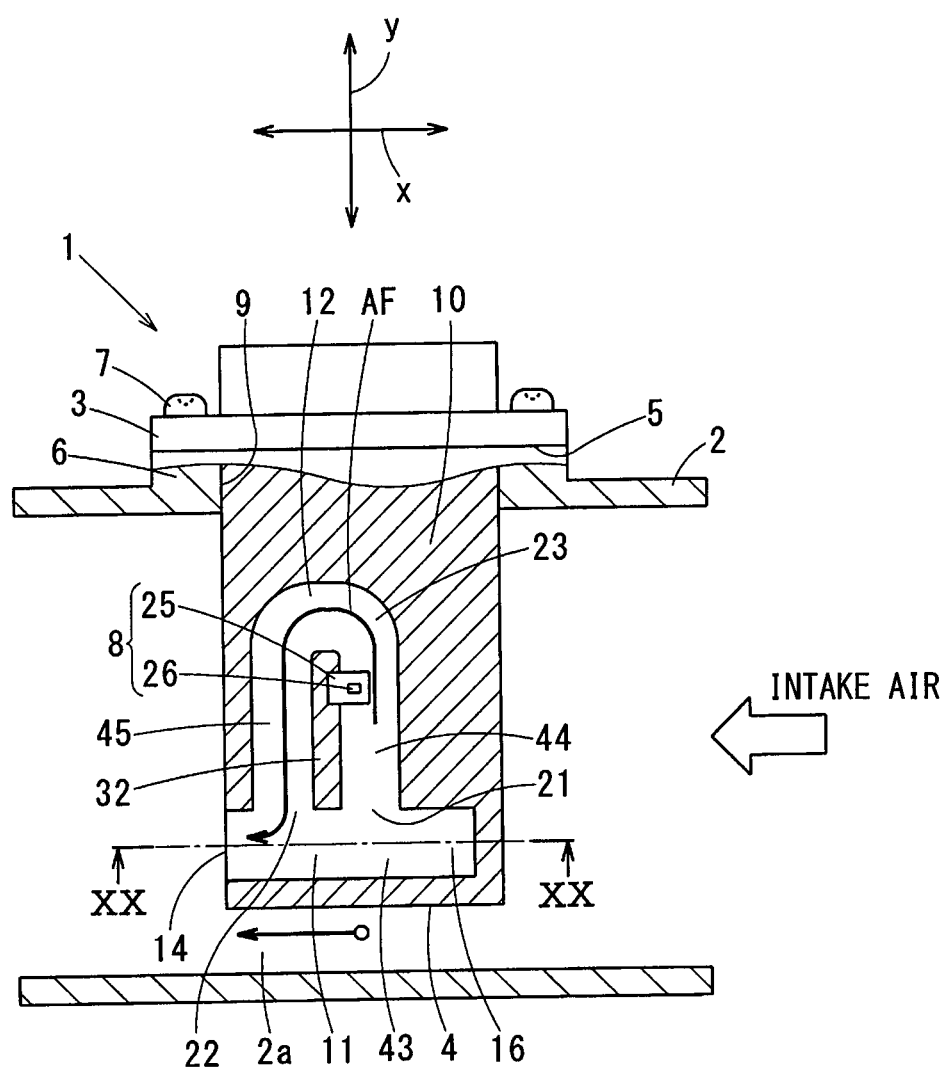
FIG. 19 is a cross-sectional view of an air flow rate measuring device attached to a duct (a sixteenth embodiment)

FIGS. 19 and 20 show an air flow measuring device 1 according to a sixteenth embodiment. The components denoted by the same reference numerals are the same as those described in the first embodiment.

The air flow measuring device 1 according to the present embodiment includes a curved portion 15 that changes a flow direction of the passing air AF from the x-axis direction to the z-axis direction. The air flow measuring device 1 includes a second curved portion 16 that changes a flow direction of the passing air AF from the z-axis direction to the x-axis direction.

Figure 20A:
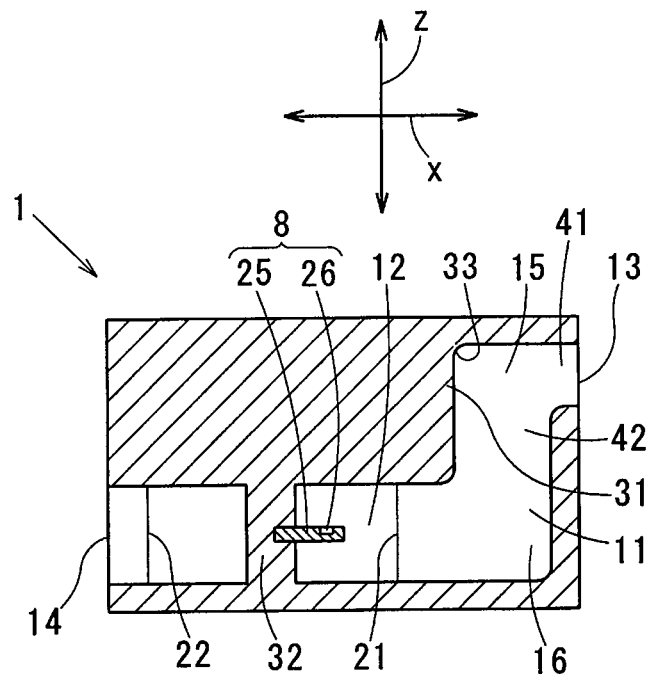
FIG. 20A is a cross-sectional view taken along XX-XX line in FIG. 19.

The curving direction of the first curved portion 15 may be a downward direction in FIG. 20A from the x-axis direction to the z-axis direction. Further, the curving direction of the second curved portion 16 may be a downstream direction from the x-axis direction to the x-axis direction, as shown in FIG. 20A.

Figure 20B:
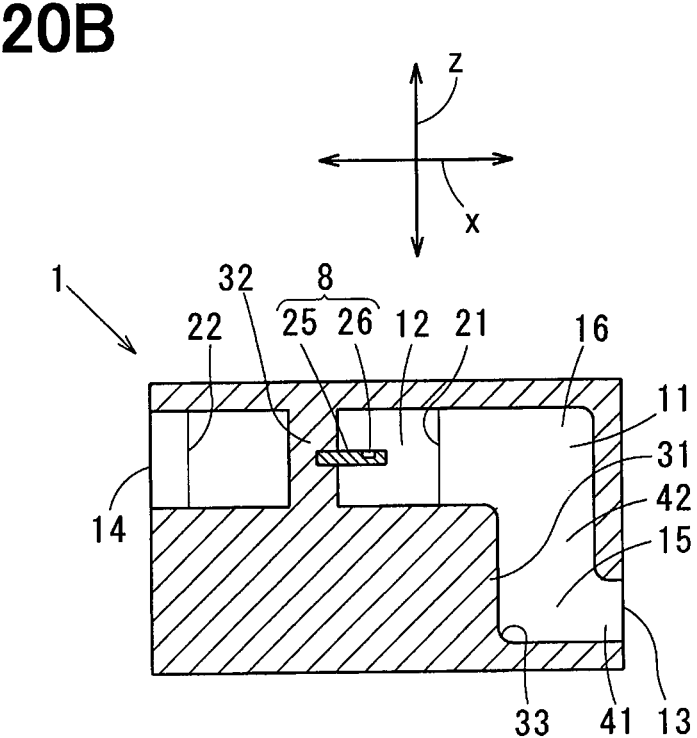
FIG. 20B is a cross-sectional view taken along XX-XX line in FIG. 19.

Alternatively, the curving direction of the first curved portion 15 may be an upward direction in FIG. 20B from the x-axis direction to the y-axis direction. Furthermore, the curving direction of the second curved portion 16 may be a downstream direction from the z-axis direction to the x-axis direction, as shown in FIG. 20B.

Modifications

In the first to sixteenth embodiments, the air flow rate measuring device 1 includes the attachment portion 3 that is fixed to the wall 6 of the duct 2 by the screws 7. Alternatively, the air flow rate measuring device 1 may include the attachment portion 3 that is fixed to the wall 6 of the duct 2 by welding or by gluing.

It should be noted that welding means fixing the attachment portion 3 to the wall 6 by melting a portion or the entire of the attachment surface 5.

Furthermore, it should be noted that gluing means fixing the attachment portion 3 to the wall 6 using a glue.

Figure 21:
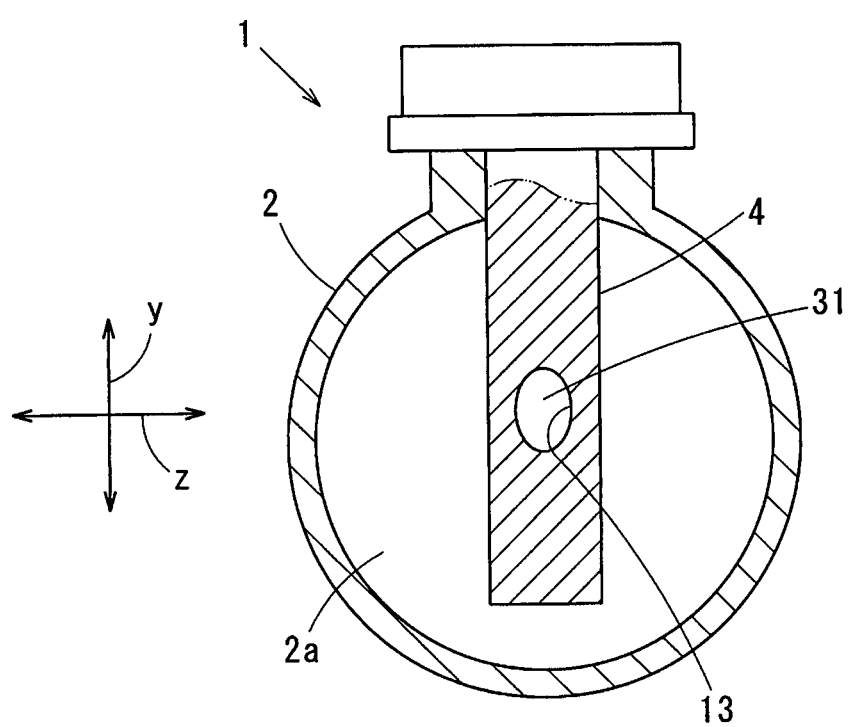
FIG. 21 is a cross-sectional view of a guiding wall of a main-bypass passage viewed through an inlet (a first modification)

In the air flow rate measuring device 1 of the first embodiment, the opening shape of the inlet 13 has a square shape. Alternatively, the opening shape of the inlet 13 may have an ellipse shape with a major axis along the y-axis direction and a minor axis along the z-axis direction, as shown in FIG. 21 as a first modification.

Alternatively, the opening shape of the inlet 13 may be a circle shape, an oval shape, or a rectangular shape. Furthermore, the opening shape of each of the outlet 14, the discharging opening 53, the branching area 21, and the merging area 22 may be a square shape, an ellipse shape, a circle shape, an oval shape, or a rectangular shape.

Furthermore, the cross-sectional shape of each of the main-bypass passage 11 and the sub-bypass passage 12 may be a square shape, an ellipse shape, a circle shape, an oval shape, or a rectangular shape.

In the air flow rate measuring device 1 of the first to sixteenth embodiments, the shape of an outside wall close to the inlet 13 has a flat shape linearly extending along the x-axis direction. Alternatively, the shape of the outside wall 61 close to the inlet 13 may have a shape that gradually expands from an opening end of the inlet 13 toward a downstream side in a direction outward of the casing 4, as shown in FIGS. 22A and 22B.

Figure 22A:
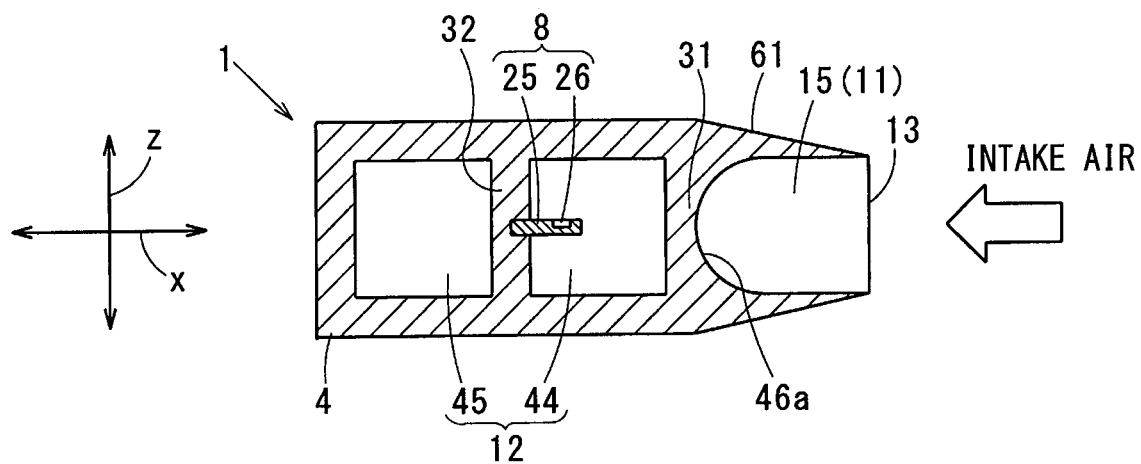
FIG. 22A is a cross-sectional view of an air flow rate measuring device (a second modification)

FIG. 22A shows a second modification that includes a tapered surface 61 on the outside wall close to the inlet 13. Conversely, as shown in FIG. 22B, a curved surface 61 outwardly protruding on the outside wall close to the inlet 13 may be used.

Accordingly, it is possible to reduce pressure loss of the intake air flowing through the duct 2.

Figure 22B:
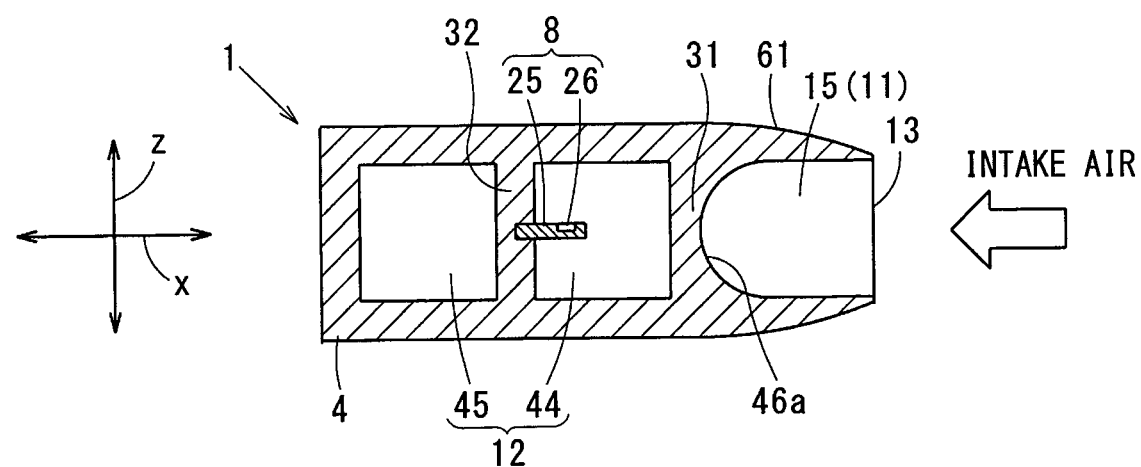
FIG. 22B is a cross-sectional view of an air flow rate measuring device (the second modification)

In FIGS. 22A and 22B, the guiding wall 31 includes the curved surface 46a recessed in a downstream direction, but the guiding wall 31 may include the slope surfaces 46b as shown in FIG. 5. Furthermore, the guiding wall 31 may include the slope surface 46c as shown in FIG. 6.

In the air flow rate measuring device 1 of the first to sixteenth embodiments, the shape of the inner wall 62 close to the inlet 13 has a shape linearly extending along the x-axis direction. Alternatively, the shape of the inner wall 62 close to the inlet 13 may have a shape that gradually decreases a cross section of the main-bypass passage 11 from an opening edge of the inlet 13 toward a downstream side of the main-bypass passage 11, as shown in FIGS. 23A and 23B as a third modification.

Figure 23A:
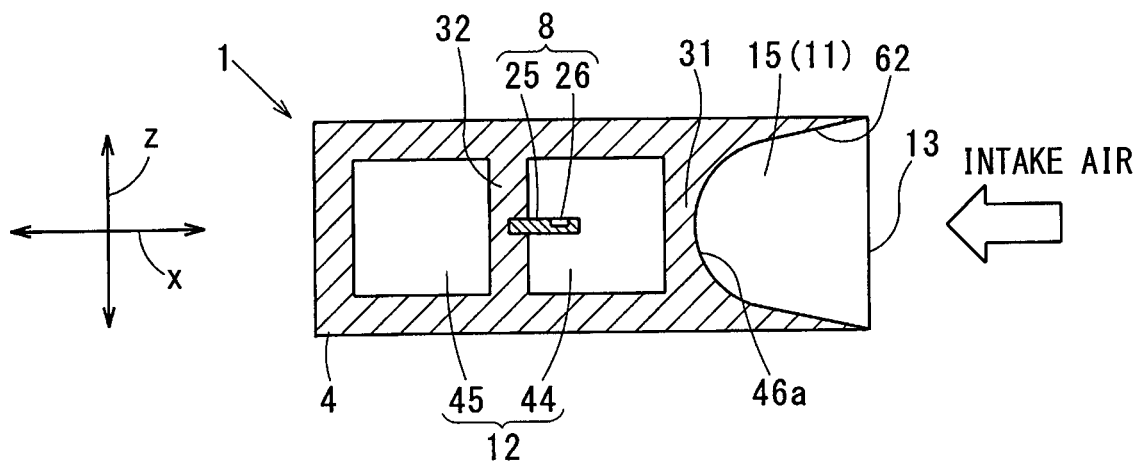
FIG. 23A is a cross-sectional view of an air flow rate measuring device (a third modification)

FIG. 23A shows the third modification that includes a tapered surface on the inside wall 62 close to the inlet 13. Conversely, the third modification shown in FIG. 23B includes a curved surface outwardly protruding on the inside wall 62 close to the inlet 13.

As a result, the dusts D collide with the inside wall 62 close to the inlet 13. Thus, kinetic energy of the dusts D can be further reduced before the dusts D reach the branching area 21.

Figure 23B:
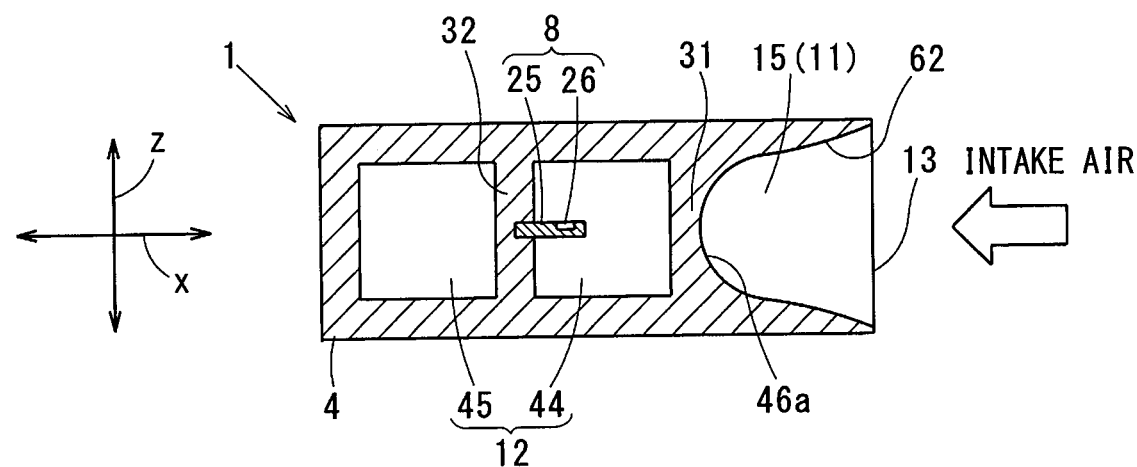
FIG. 23B is a cross-sectional view of an air flow rate measuring device (the third modification)

It should be noted that the guiding wall 31 includes the curved surface 46a recessed toward a downstream direction in FIGS. 23A and 23B, but the guiding wall 31 may include the slope surfaces 46b as shown in FIG. 5. Furthermore, the guiding wall 31 may include the slope surface 46c as shown in FIG. 6.

Figure 24A:
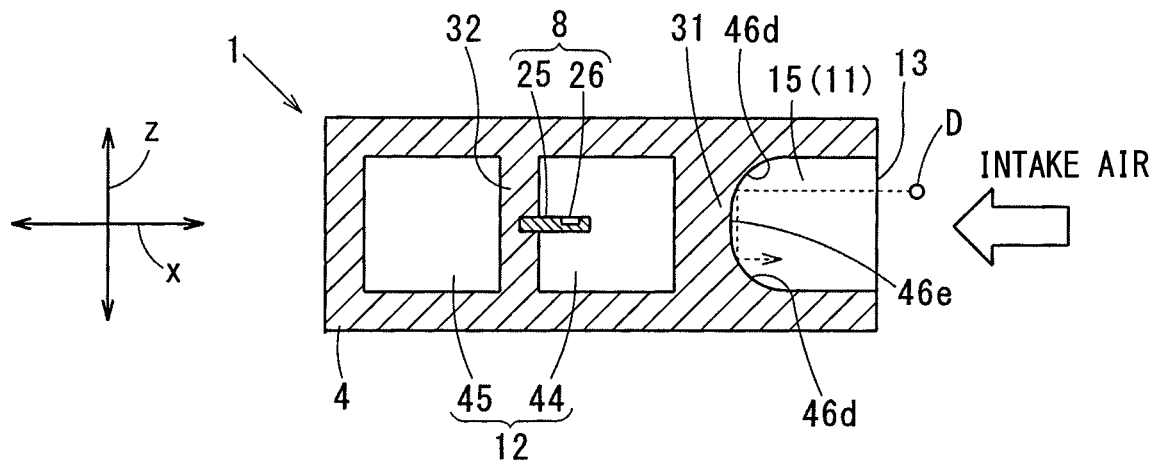
FIG. 24A is a cross-sectional view of an air flow rate measuring device (a fourth modification)

In the air flow rate measuring device 1 of the first to third embodiments, the guiding wall 31 includes the curved surface 46a having a curved groove shape or the slope surfaces 46b having a V-shaped groove shape. Alternatively, as shown in FIG. 24A as a fourth modification, the guiding wall 31 may include two curved surfaces 46d each having a semicircular groove shape and one flat surface 46e. More specifically, the guiding wall 31 may have a shape with the two curved surfaces 46d and the flat surface 46e therebetween.

Figure 24B:
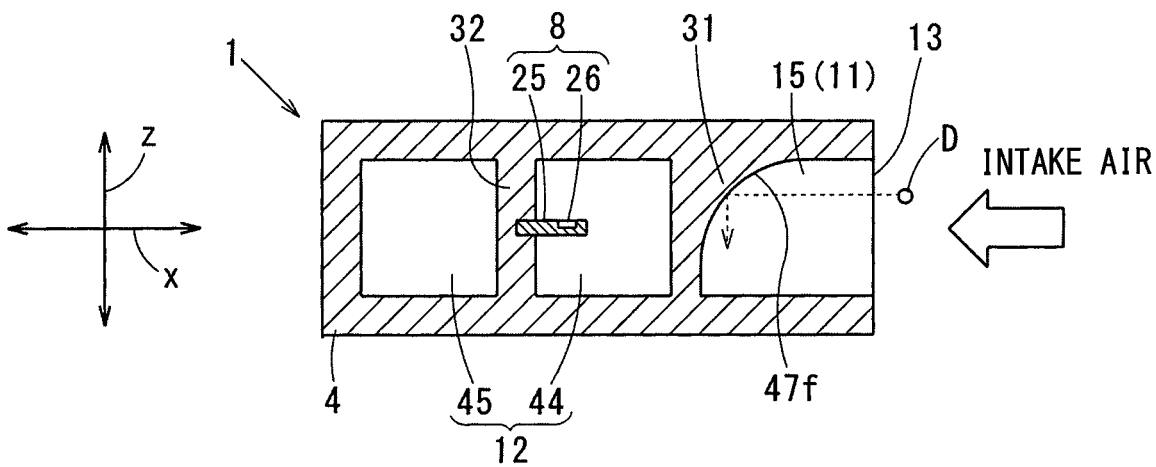
FIG. 24B is a cross-sectional view of an air flow rate measuring device (the fourth modification).

Alternatively, the guiding wall 31 may include a recessed curved surface 47f having a semicircular groove shape, as shown in FIG. 24B.

Hence, the same operation and effects can be obtained as the first to third embodiments.

In the air flow rate measuring device 1 of the first to sixteenth embodiments, the flow direction of the passing air AF in a portion of the main-bypass passage 11 and the flow direction of the passing air AF in a portion of the sub-bypass passage 12 form the angle of 180 degrees. Alternatively, the flow direction of the passing air AF in the portion of the main-bypass passage 11 and the flow direction of the passing air AF in the portion of the sub-bypass passage 12 may form an angle greater than 180 degrees.

In the air flow rate measuring device 1 of the first to sixteenth embodiments, the number of curves of the main-bypass passage 11 is two by first and second curved portions 15, 16, and the number of curves of the sub-bypass passage 12 is one by the third curved portion 23. However, the number of the curves of the main-bypass passage 11 and the sub-bypass passage 12 is not necessarily limited to one. For example, the number of curves of the main-bypass passage 11 may be one or three or more, and the number of curves of the sub-bypass passage 12 may be three or more.

Each of the angle of the first curved portion 15 and the angle of the second curved portion 16 is 90 degrees in the air flow rate measuring device 1 according to the first embodiment, and the angle of the second curved portion 16 is greater than 90 degrees in the air flow rate measuring device 1 according to the ninth embodiment as shown in FIG. 12. However, the angles may be not necessarily limited to those.

That is, the angle of the first curved portion 15 may be greater than 90 degrees, and the second curved portion 16 may be less than 90 degrees.

In the air flow rate measuring device 1 according to the first to sixteenth embodiments, the angle of the third curved portion 23 is 180 degrees. However, the angle of the third curved portion 23 may have a value other than 180 degrees.

What is claimed is:

1. An air flow rate measuring device, comprising:
   a casing that is attached to a duct through which an intake air for an internal combustion engine flows along a first direction, the casing protruding into the duct along a second direction perpendicular to the first direction, a portion of the intake air passing through the casing as a passing air; and
   a sensor that detects a flow rate of the passing air, the air flow rate measuring device measuring a flow rate of the intake air based on a detection result of the sensor, wherein
   the casing includes:
   a main-bypass passage that defines an inlet to take in the intake air and an outlet to discharge the passing air taken in from the inlet;
   a sub-bypass passage that branches off from the main-bypass passage at a branching area downstream of the inlet, the sensor being disposed in the sub-bypass passage; and
   a guiding wall that is located downstream of the inlet along the first direction and changes, at a position upstream of the branching area, a flow direction of the passing air taken in from the inlet,
   the guiding wall is not perpendicular to a plane which is parallel to the first and second directions,
   the guiding wall includes an inlet side surface that faces the inlet, and
   in a cross section of the guiding wall taken along both the first direction and a third direction direction perpendicular to the first and second directions, the inlet side surface is not perpendicular to the first direction.

2. The air flow rate measuring device according to claim 1, wherein
   the sub-bypass passage includes a curved portion that changes, at a position upstream of the sensor, a flow direction of the passing air taken in from the main-bypass passage, and
   the casing includes a plurality of recessed portions that are recessed from an outer wall of the curved portion in a direction radially outward of the curved portion.

3. The air flow rate measuring device according to claim 1, wherein
   a direction of the intake air flowing through the outlet is angled with a direction of the intake air flowing through the inlet.

4. The air flow rate measuring device according to claim 1, wherein
   the sub-bypass passage includes a curved portion in the sub-bypass passage,
   the curved portion changes, in the sub-bypass passage, a direction of the passing air, and
   the sensor is disposed in the curved portion.

5. The air flow rate measuring device according to claim 1, wherein
   the guiding wall extends parallel to the second direction.

6. The air flow rate measuring device according to claim 1, wherein
   the inlet side surface is not perpendicular to the plane parallel to the first and second directions.

7. The air flow rate measuring device according to claim 1, wherein
   the main-bypass passage includes a guiding passage extending along the guiding wall and a passage extending from the guiding passage toward the outlet,
   the sub-bypass passage includes an inflow sub-passage through which the passing air from the passage flows and an outflow sub-passage from which the passing air flows out toward the outlet,
   the guiding wall separates the guiding passage from the inflow sub-passage in a direction such that the inflow sub-passage extends along the guiding passage,
   the casing includes a sub-bypass wall that separates the outflow sub-passage from the inflow sub-passage such that the inflow sub-passage extends along the outflow sub-passage, and
   the sensor is disposed in the inflow sub-passage to detect a flow rate of the passing air.

8. The air flow rate measuring device according to claim 7, wherein the sub-bypass wall extends along the guiding wall on a side of the inflow sub-passage opposite to the guiding passage, and the sub-bypass wall protrudes toward the passage more than the guiding wall protrudes toward the passage.

9. The air flow rate measuring device according to claim 7, wherein the sub-bypass wall extends along the guiding wall on a side of the inflow sub-passage opposite to the guiding passage, and the guiding wall protrudes toward the passage more than the sub-bypass wall protrudes toward the passage.

10. An air flow rate measuring device, comprising:

a casing that is attached to a duct through which an intake air for an internal combustion engine flows, a portion of the intake air passing through the casing as a passing air; and a sensor that detects a flow rate of the passing air, the air flow rate measuring device measuring a flow rate of the intake air based on a detection result of the sensor; and an attachment surface that attaches the air flow rate measuring device to the duct, wherein the casing includes:

a main-bypass passage that defines an inlet to take in the intake air and an outlet to discharge the passing air taken in from the inlet;

a sub-bypass passage that branches off from the main-bypass passage at a branching area downstream of the inlet, the sensor being disposed in the sub-bypass passage; and a guiding wall that faces the inlet along a first direction which is parallel to the attachment surface and that is disposed downstream of the inlet and changes, at a position upstream of the branching area, a flow direction of the passing air taken in from the inlet, the main-bypass passage includes:

a first curved portion that changes, in the main-bypass passage, a direction of the intake air taken in from the inlet, the first curved portion changing the direction of the intake air from the first direction to a second direction perpendicular to the attachment surface; and a second curved portion that changes, at a position downstream of the first curved portion, a direction of the passing air, the guiding wall is an outer circumferential surface of the first curved portion, and an angle of the first curved portion is smaller than an angle of the second curved portion.

11. The air flow rate measuring device according to claim 10, wherein a direction of the intake air flowing through the outlet is angled with a direction of the intake air flowing through the inlet.

12. The air flow rate measuring device according to claim 10, wherein the angle of the second curved portion is larger than 90 degrees.

13. The air flow rate measuring device according to claim 10, wherein the main-bypass passage includes a guiding passage extending along the guiding wall and a passage extending from the guiding passage toward the outlet, the sub-bypass passage includes an inflow sub-passage through which the passing air from the passage flows and an outflow sub-passage from which the passing air flows out toward the outlet, the guiding wall separates the guiding passage from the inflow sub-passage in a direction such that the inflow sub-passage extends along the guiding passage, the casing includes a sub-bypass wall that separates the outflow sub-passage from the inflow sub-passage such that the inflow sub-passage extends along the outflow sub-passage, and the sensor is disposed in the inflow sub-passage to detect a flow rate of the passing air.

14. The air flow rate measuring device according to claim 13, wherein the sub-bypass wall extends along the guiding wall on a side of the inflow sub-passage opposite to the guiding passage, and the sub-bypass wall protrudes toward the passage more than the guiding wall protrudes toward the passage.

15. The air flow rate measuring device according to claim 13, wherein the sub-bypass wall extends along the guiding wall on a side of the inflow sub-passage opposite to the guiding passage, and the guiding wall protrudes toward the passage more than the sub-bypass wall protrudes toward the passage.

16. The air flow rate measuring device according to claim 10, wherein the guiding wall includes an inlet side surface that faces the inlet along a facing the first direction, and the inlet side surface includes a slope surface that is tapered along a direction away from the inlet.

17. The air flow rate measuring device according to claim 16, wherein the guiding wall has a thickness along the first direction that increases as the slope surface approaches the inlet.

18. The air flow rate measuring device according to claim 16, wherein the sloped surface has a first side and a second side facing each other along a third direction perpendicular to the first direction and the second direction, the first side is located between the second side and the inlet along the first direction, and the guiding wall has a thickness along the first direction that increases from the second side toward the first side.

19. An air flow rate measuring device, comprising:

an attachment portion that has an attachment surface, the attachment surface being attached to a duct through which an intake air for an internal combustion engine flows;

a casing through which a portion of the intake air passes as a passing air; and a sensor that detects a flow rate of the passing air, the air flow rate measuring device measuring a flow rate of the intake air based on a detection result of the sensor, wherein the casing includes:

a main-bypass passage that defines an inlet to take in the intake air and an outlet to discharge the passing air taken in from the inlet;

a sub-bypass passage that branches off from the main-bypass passage at a branching area downstream of the inlet, the sensor being disposed in the sub-bypass passage; and a guiding wall that is disposed downstream of the inlet and changes, at a position upstream of the branching area, a flow direction of the passing air taken in from the inlet, the guiding wall has an inlet side surface that faces the inlet along a facing direction, the inlet side surface has:
- a first side and a second side facing each other along a direction, the direction being parallel to the attachment surface and perpendicular to the facing direction; and
- an intermediate portion located between the first side and the second side along the direction, and the inlet side surface is tapered with respect to the direction with at least one of the first side or the second side being located between the intermediate portion and the inlet along the facing direction.

20. The air flow rate measuring device according to claim 19, wherein
the intermediate portion is located between the first side and the second side along the facing direction.

21. The air flow rate measuring device according to claim 19, wherein
both of the first side and the second side are located between the inlet and the intermediate portion.

\* \* \* \* \*